US011956062B2

(12) United States Patent
Raghavan et al.

(10) Patent No.: US 11,956,062 B2
(45) Date of Patent: *Apr. 9, 2024

(54) MILLIMETER WAVE RELAY LINK DISCOVERY

(71) Applicant: QUALCOMM Incorporated, San Diego, CA (US)

(72) Inventors: Vasanthan Raghavan, West Windsor Township, NJ (US); Tianyang Bai, Somerville, NJ (US); Jung Ho Ryu, Fort Lee, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 17/619,936

(22) PCT Filed: May 19, 2020

(86) PCT No.: PCT/US2020/033569
§ 371 (c)(1),
(2) Date: Dec. 16, 2021

(87) PCT Pub. No.: WO2020/256875
PCT Pub. Date: Dec. 24, 2020

(65) Prior Publication Data
US 2022/0321203 A1    Oct. 6, 2022

Related U.S. Application Data

(63) Continuation of application No. 16/446,501, filed on Jun. 19, 2019, now Pat. No. 11,108,459.

(51) Int. Cl.
*H04B 7/155* (2006.01)
*H04W 8/00* (2009.01)
(Continued)

(52) U.S. Cl.
CPC .......... *H04B 7/1555* (2013.01); *H04W 8/005* (2013.01); *H04W 74/0833* (2013.01); *H04W 76/14* (2018.02)

(58) Field of Classification Search
CPC ... H04B 7/1555; H04B 7/0617; H04W 76/14; H04W 8/005; H04W 74/0833;
(Continued)

(56) References Cited

U.S. PATENT DOCUMENTS 6,330,459 B1    12/2001  Crichton et al.
10,396,881 B2    8/2019  Akkarakaran et al.
(Continued)

FOREIGN PATENT DOCUMENTS

WO    WO-2017213797 A1    12/2017
WO    WO-2018125686 A2    7/2018

OTHER PUBLICATIONS

International Search Report and Written Opinion—PCT/US2020/033569—ISA/EPO—dated Sep. 17, 2020.
(Continued)

*Primary Examiner* — Khanh C Tran
(74) *Attorney, Agent, or Firm* — QUALCOMM IP DEPT.; James Hunt Yancey, Jr.

(57) ABSTRACT

Aspects of the disclosure relate to millimeter wave (mm-Wave) device discovery for relay communication using pseudo-omnidirectional beams. A first user equipment (UE) may transmit a synchronization signal over each pseudo-omnidirectional beam to enable a second UE to discover a presence of the second UE within a range of the first UE. Upon the occurrence of an external event, a base station may either trigger a beam training procedure with the second UE to establish a relay link between the first and second UEs or broadcast a message to all UEs requesting a relay link be established with the first UE. The first and second UEs may
(Continued)

then select a directional beam pair link (BPL) for the relay link and establish the relay link to enable information to be relayed between the base station and the first UE via the relay link.

20 Claims, 17 Drawing Sheets

(51) Int. Cl.
*H04W 74/08* (2009.01)
*H04W 74/0833* (2024.01)
*H04W 76/14* (2018.01)

(58) Field of Classification Search
CPC ..... H04W 48/12; H04W 92/18; H04W 88/04; H04W 84/047
See application file for complete search history.

(56) References Cited

U.S. PATENT DOCUMENTS

| 10,601,477 | B2* | 3/2020 | Abedini ............ H04W 74/0833 |
| 11,108,459 | B2 | 8/2021 | Raghavan |
| 2009/0232106 | A1 | 9/2009 | Cordeiro et al. |
| 2010/0167743 | A1 | 7/2010 | Palanki et al. |
| 2011/0287796 | A1 | 11/2011 | Jain et al. |
| 2015/0305075 | A1 | 10/2015 | Fodor et al. |
| 2017/0273041 | A1 | 9/2017 | Seo et al. |
| 2017/0332440 | A1 | 11/2017 | Xu et al. |
| 2018/0092017 | A1 | 3/2018 | Freda et al. |
| 2018/0213508 | A1 | 7/2018 | Chai et al. |
| 2018/0278318 | A1 | 9/2018 | Chakraborty et al. |
| 2018/0279202 | A1 | 9/2018 | Tenny et al. |
| 2018/0332551 | A1 | 11/2018 | Liu et al. |
| 2018/0368126 | A1 | 12/2018 | Islam et al. |
| 2019/0110281 | A1* | 4/2019 | Zhou ................... H04B 7/0695 |
| 2019/0215759 | A1 | 7/2019 | Wei et al. |
| 2019/0356368 | A1 | 11/2019 | Liu et al. |
| 2020/0178292 | A1 | 6/2020 | Kim et al. |
| 2021/0068191 | A1* | 3/2021 | Liu ..................... H04W 56/001 |

OTHER PUBLICATIONS

Junquan D., et al., "Resource Allocation and Interference Management for Opportunistic Relaying in Integrated mmWave/Sub-6 GHz 5G Networks", IEEE Communications Magazine, vol. 55, No. 6, Jun. 9, 2017 (Jun. 9, 2017), pp. 94-101, XP011652249, ISSN: 0163-6804, DOI: 10.1109/MCOM.2017.1601120, [retrieved on Jun. 9, 2017], the Whole Document.

China Notice of First Office Action issued in Application No. 202080043504.5, dated Nov. 27, 2023 (including English-language translation provided by CN Counsel).

EPO Communication Pursuant to Rule 164(2)(b) and Article 94(3) issued in Application No. 20730916.2, dated Jan. 31, 2024.

* cited by examiner

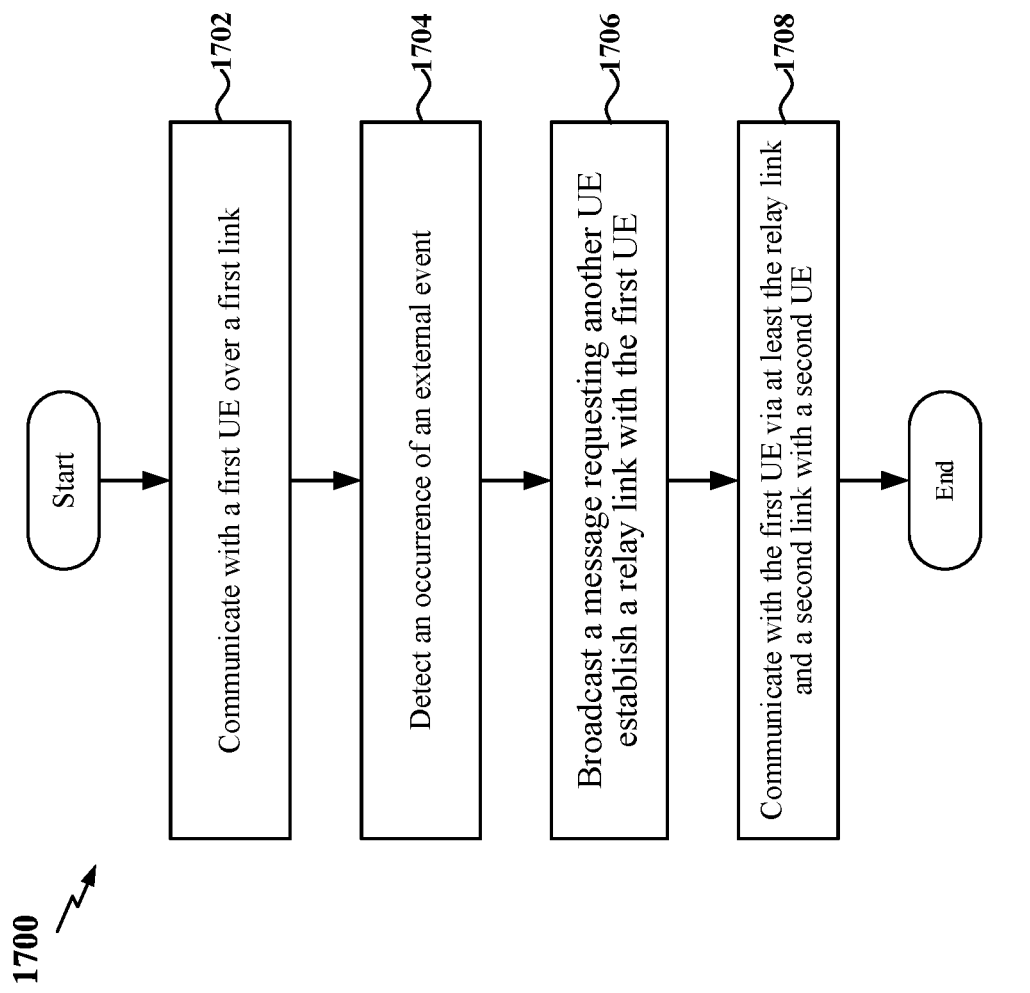

MILLIMETER WAVE RELAY LINK DISCOVERY

CLAIM OF PRIORITY UNDER 35 U.S.C. § 119

The present application claims priority to and the benefit of U.S. Non-Provisional application Ser. No. 16/446,501, filed Jun. 19, 2019 which is expressly incorporated by reference herein.

TECHNICAL FIELD

The technology discussed below relates generally to mobile devices in wireless communication networks, and more particularly, to millimeter wave relay link discovery and relay link establishment. Some embodiments and techniques enable and provide communication devices, methods, and systems with side link relay discovery features capable of providing improved coverage using one or more relays.

INTRODUCTION

Communication networks have used relays in varying capacities. Relaying in cellular networks seeks to extend base station coverage, improve transmission reliability, and recover failed links due to, for example, blockage or fading. A relaying node may be a fixed node or a mobile device (e.g., a user equipment (UE)). Relaying between mobile devices may be achieved using device-to-device (D2D) technology. D2D allows UEs to communicate over direct links, instead of through cellular network infrastructure.

D2D communications may use various frequency bands. Fifth-generation wireless technology, or 5G, may employ millimeter wave (mmWave) frequency transmissions in the range of 24 to 52.6 gigahertz (GHz) or more. Due to the high propagation loss experienced by mmWaves, wireless devices may utilize highly directional antenna beams to facilitate mmWave communication. With the increase in mobile traffic, mmWave communication has become an attractive option for D2D relaying. However, the directional nature of mmWave transmissions, along with power, thermal and maximum permissible exposure (MPE) constraints of mmWave communications have provided several challenges to implementing mmWave technology within D2D relaying networks.

As the demand for 5G wireless communication increases, research and development continue to advance 5G technologies not only to meet the growing demand for 5G wireless communication, but also to advance and enhance the user experience.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to mmWave device (e.g., UE) discovery for relay communication using pseudo-omnidirectional beams. A pseudo-omnidirectional beam may be formed, for example, by transmitting or receiving at a single antenna element of an antenna array module. A transmitting UE may transmit a synchronization signal over each pseudo-omnidirectional beam (e.g., from each antenna array module) to enable a receiving UE to discover a presence of the receiving UE within a range of the transmitting UE and synchronize communication with the transmitting UE. In some examples, the synchronization signal includes a cell identifier (ID) of the transmitting UE. The receiving UE may either convey the cell ID of the transmitting UE received in the synchronization signal to a base station or store the cell ID locally for further use.

According to some examples, enabling UEs to serve in a relay capacity brings about a variety of improvements. For example, establishment of UE-based relay links in mmWave communication scenarios not only enables UEs to be used as relay tools yet also can provide arrangements where base stations have at least some control functions. As such, though in some use cases UEs can scan autonomously and discover relay nodes/links, base stations can be allowed or configured to intervene in established links. And, network overhead associated with beam management and link maintenance may reduced and/or minimized.

In examples in which the receiving UE conveys the cell ID to the base station, the base station may trigger a beam training procedure to establish a relay link between the transmitting and receiving UEs upon the occurrence of an external event. Examples of external events may include blockage of a wireless communication link between the base station and transmitting UE, fading of the wireless communication link between the base station and the transmitting UE, or initiation of assisted communication for the wireless communication link using the relay link. In this example, the receiving UE may initiate beam training with the transmitting UE and establish the relay link. For example, the receiving UE may initiate a random-access procedure with the transmitting UE to establish a random access link over a pair of pseudo-omnidirectional beams either after receiving the synchronization signal or after receiving the message from the base station. The receiving UE may then perform beam training with the transmitting UE over the random-access link after receiving the message from the base station to select a directional beam pair link (BPL) for the relay link and then establish the relay link using the directional BPL.

In examples in which the receiving UE locally stores the cell ID of the transmitting UE, the base station may broadcast a message requesting a relay link be established with the transmitting UE upon the occurrence of an external event. In this example, the receiving UE may receive the broadcast message, determine that the receiving UE is within range of the transmitting UE (e.g., based on the stored cell ID), perform beam training with the transmitting UE and establish a relay link with the transmitting UE. For example, the receiving UE may initiate a random access procedure with the transmitting UE after receiving the broadcast message to establish a random access link over a pair of pseudo-omnidirectional beams, perform beam training with the transmitting UE over the random access link to select a directional beam pair link (BPL) for the relay link and then establish the relay link using the directional BPL. In either example, the relay link may then be used to relay information between the base station and the transmitting UE.

In one example, a method for wireless communication at a first user equipment (UE) in a wireless communication network is disclosed. The method includes communicating with a base station over a first link, receiving a synchronization signal from a second UE via at least one pseudo-omnidirectional beam to discover a presence of the first UE within a range of the second UE, receiving a message from the base station over the first link indicating the first UE should establish a relay link with the second UE, selecting a directional beam pair link for the relay link, establishing the relay link using the directional beam pair link, and relaying information between the second UE and the base station via the first link and the relay link.

Another example provides a first user equipment (UE) including a wireless transceiver, a memory, and a processor communicatively coupled to the wireless transceiver and the memory. The processor is configured to communicate with a base station over a first link, receive a synchronization signal from a second UE via at least one pseudo-omnidirectional beam to discover a presence of the first UE within a range of the second UE, receive a message from the base station over the first link indicating the first UE should establish a relay link with the second UE, select a directional beam pair link for the relay link, establish the relay link using the directional beam pair link, and relay information between the second UE and the base station via the first link and the relay link.

Another example provides a method of wireless communication at a first user equipment (UE) in a wireless communication network. The method includes communicating with a base station over a first link, broadcasting a synchronization signal via at least one pseudo-omnidirectional beam to enable a second UE to discover a presence of the second UE within a range of the first UE, establishing a relay link with the second UE utilizing a directional beam pair link upon an occurrence of an external event, and communicating with the base station via the relay link.

Another example provides a first user equipment (UE) including a wireless transceiver, a memory, and a processor communicatively coupled to the wireless transceiver and the memory. The processor is configured to communicate with a base station over a first link, broadcast a synchronization signal via at least one pseudo-omnidirectional beam to enable a second UE to discover a presence of the second UE within a range of the first UE, establish a relay link with the second UE utilizing a directional beam pair link upon an occurrence of an external event, and communicate with the base station via the relay link.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 17 is a flow chart of another exemplary method for a base station to establish a mmWave relay link according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
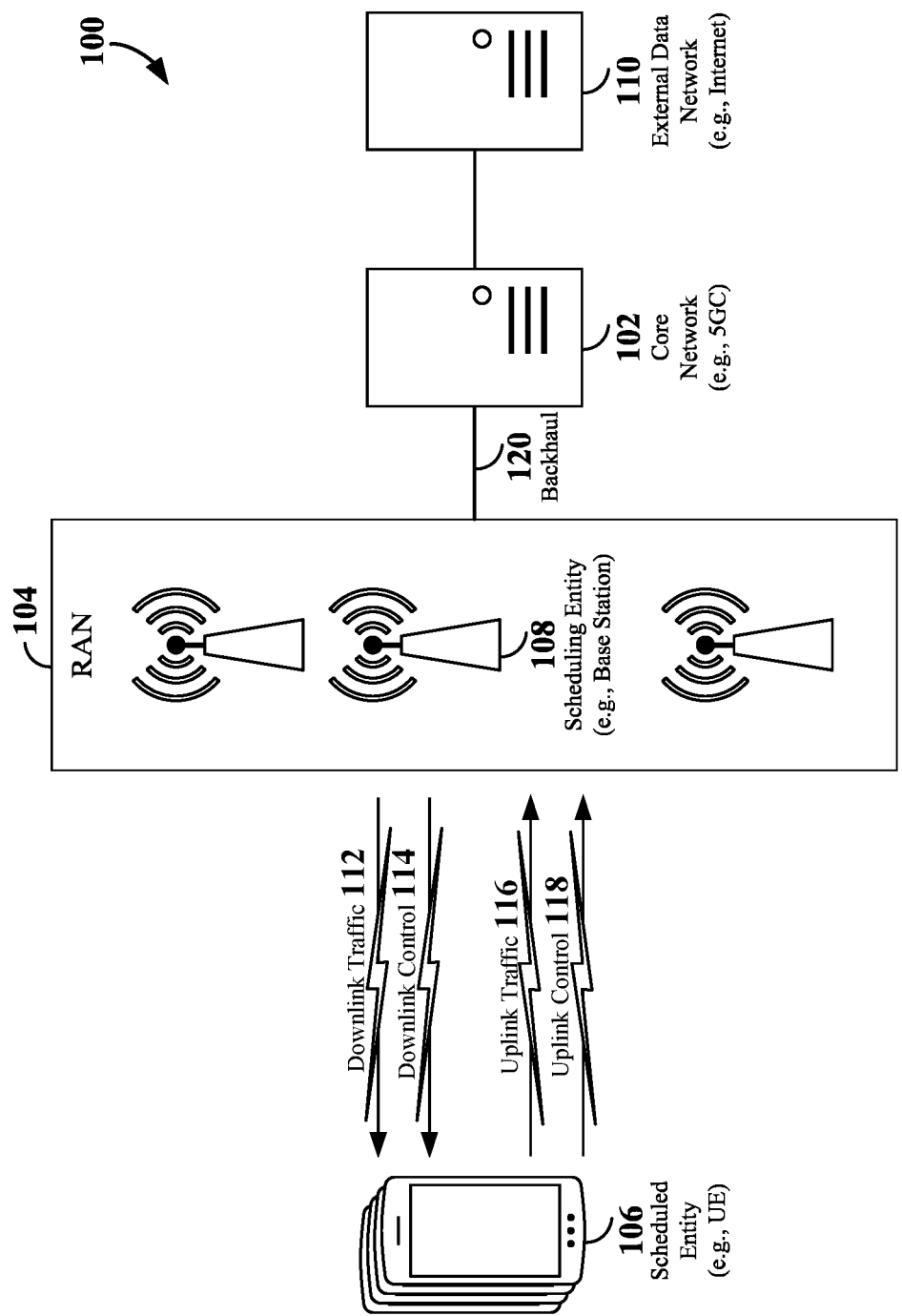
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
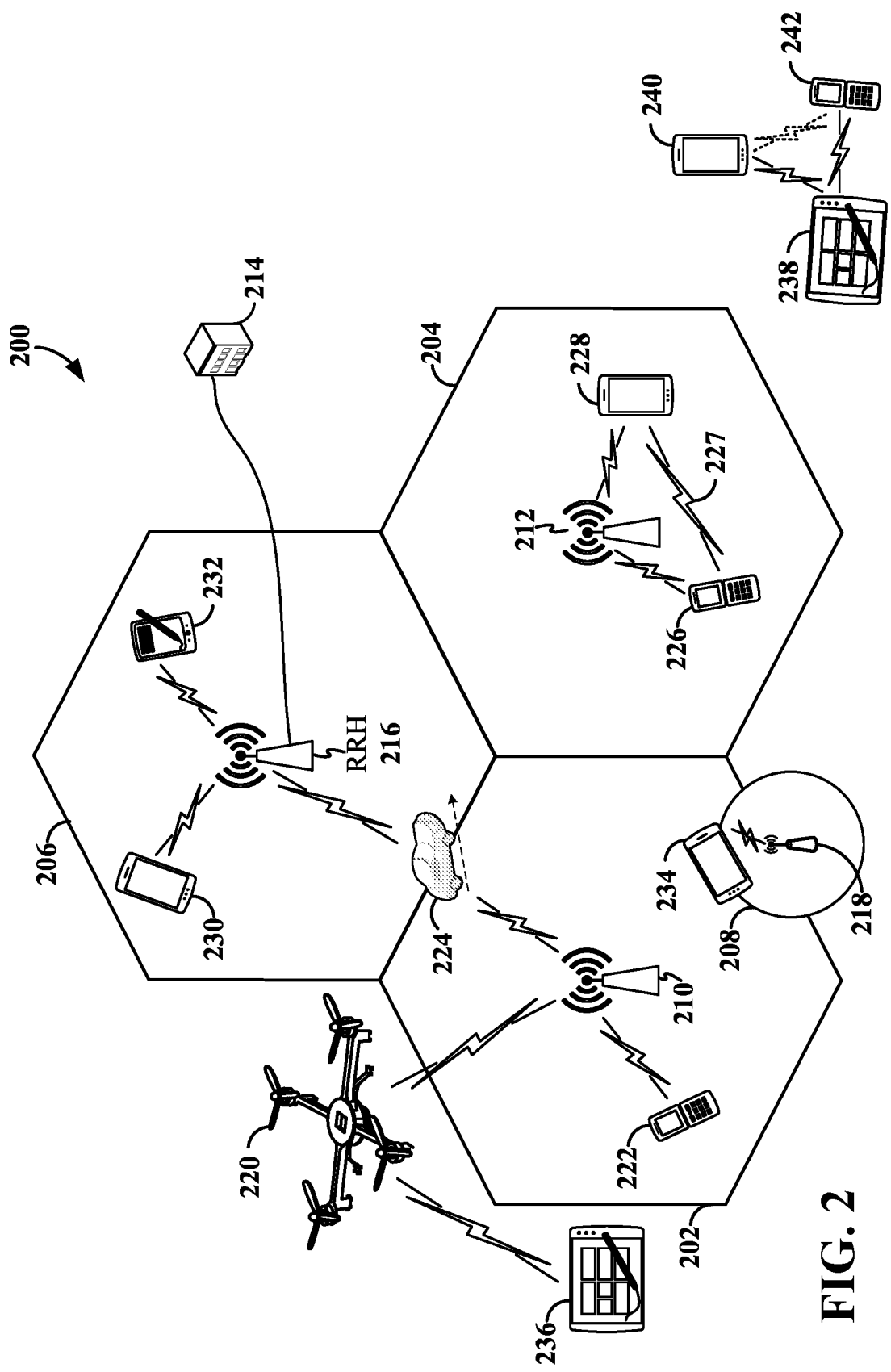
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may each function as a scheduled entity or a non-primary (e.g., secondary) sidelink device. In still another example, a UE may function as a scheduling entity or scheduled entity in a device-to-device (D2D), peer-to-peer (P2P), vehicle-to-vehicle (V2V) network, vehicle-to-everything (V2X) and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
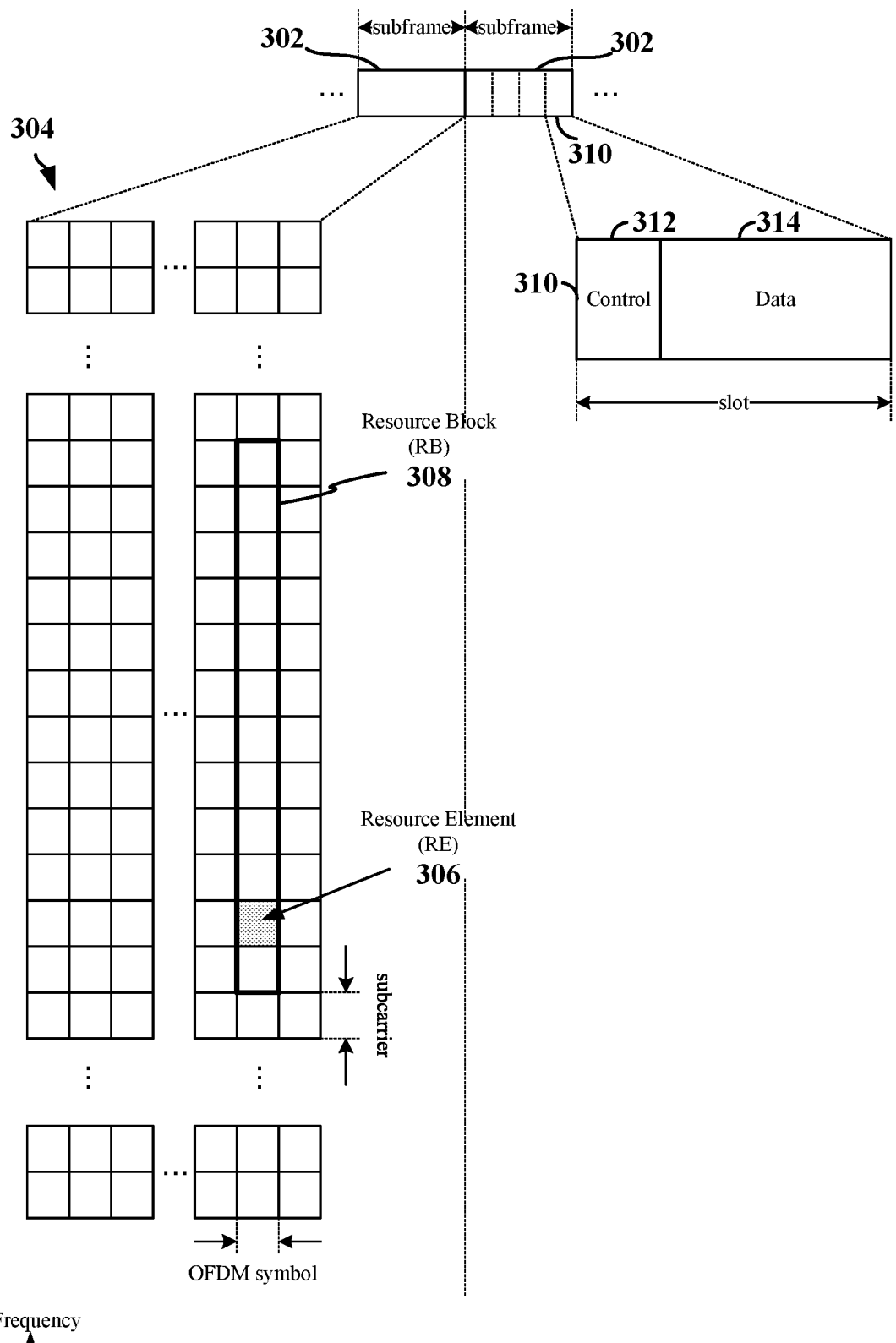
FIG. 3 is a diagram illustrating an example of a frame structure for use in a radio access network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
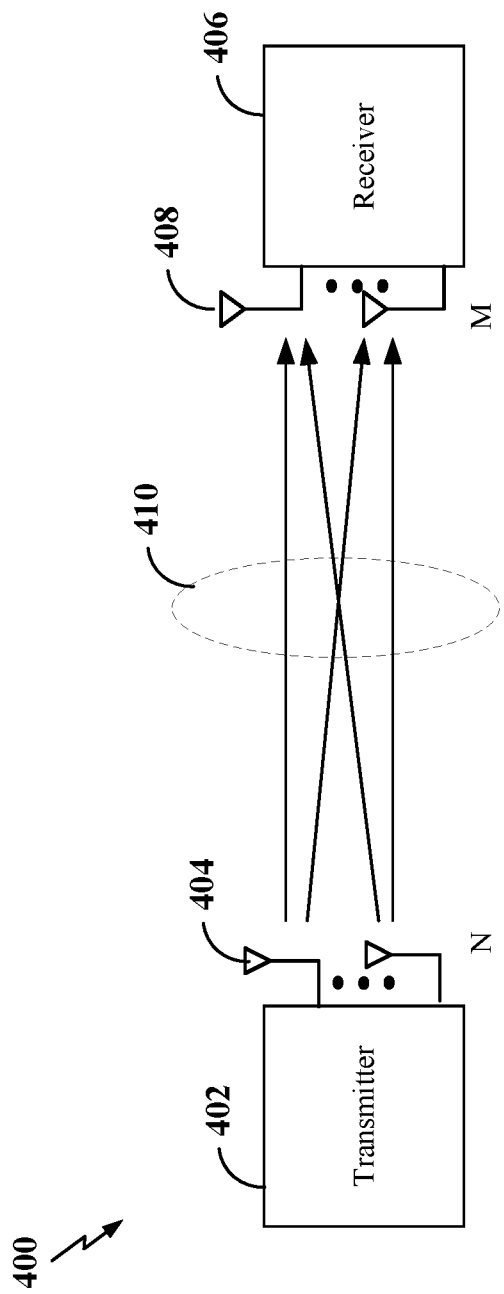
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the master system information block (MSIB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH).

Beamforming may further be utilized in D2D systems, in which two or more UEs may communicate over a direct link with one other without traversing a base station. For example, the UEs may communicate using narrow directional beams over a mmWave carrier frequency. Here, D2D communication may refer to sidelink communication or relaying communication. It should be understood that D2D relaying communication may not utilize sidelink signals, but rather may utilize existing uplink/downlink signals transmitted over existing resources (e.g., within resources allocated for uplink transmissions) in a cellular network. In various aspects of the disclosure, a D2D relay framework may be included within a cellular network to facilitate relaying of communication to/from the base station via D2D links. For example, one or more UEs within the coverage area of a base station may operate as relaying UEs to extend the coverage of the base station, improve the transmission reliability to one or more UEs, and/or to allow the base station to recover from a failed UE link due to, for example, blockage or fading.

Figure 5:
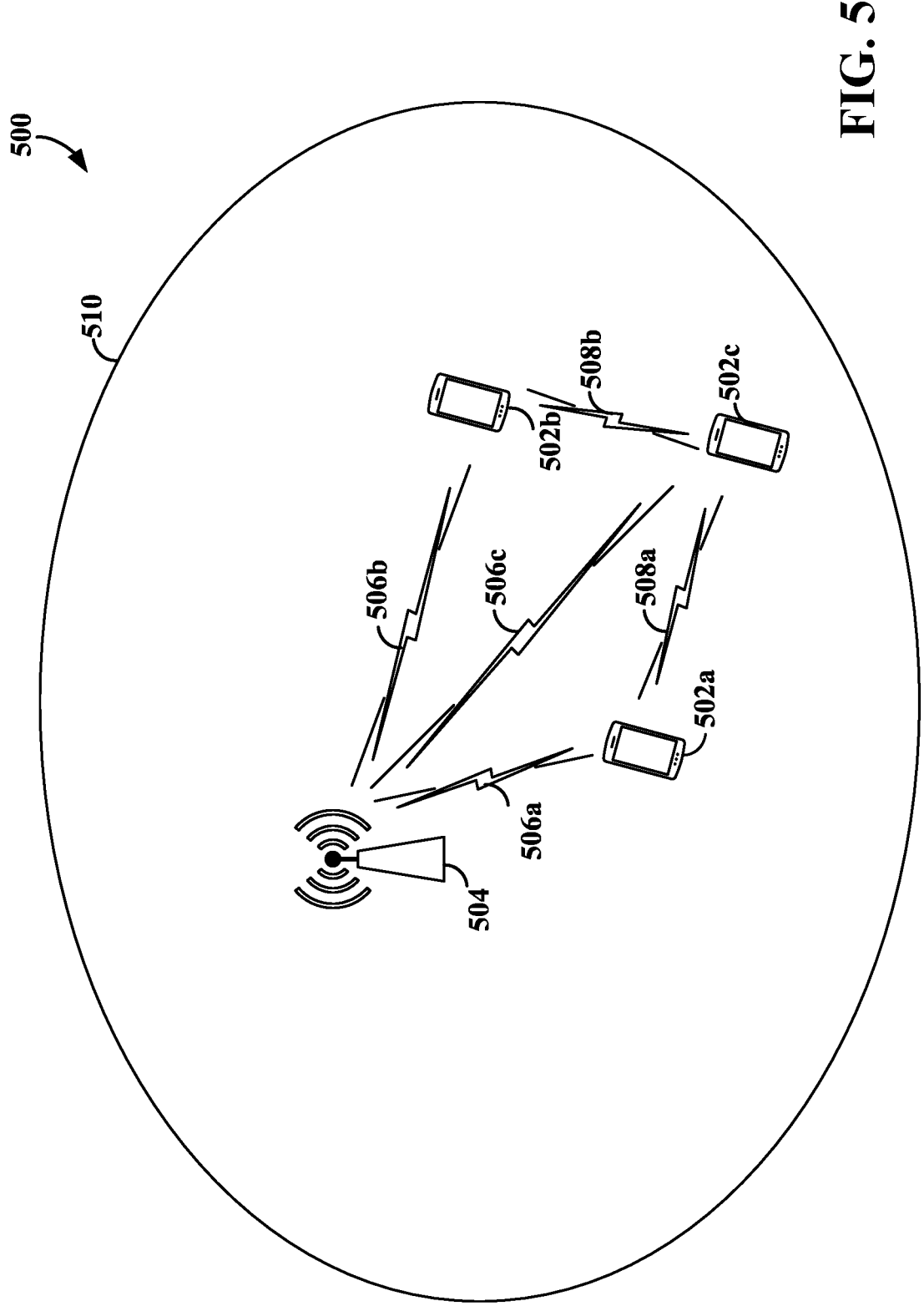
FIG. 5 is a diagram illustrating an exemplary wireless network employing D2D relaying according to some aspects.

FIG. 5 is a diagram illustrating an exemplary wireless network 500 employing D2D relaying. The wireless network 500 may correspond, for example, to the RAN 200 illustrated in FIG. 2. The wireless network 500 may include a fifth generation base station (e.g., a gNB) 504 in wireless communication one or more UEs 502a, 502b, and 502c within a coverage area of a cell 510 served by the base station 504. In the example shown in FIG. 5, the base station 504 may communicate with each of the UEs 502a, 502b, and 502c via a respective wireless communication link 506a, 506b, and 506c. Each of the wireless communication links 506a, 506b, and 506c may utilize a sub-6 GHz carrier frequency or a mmWave carrier frequency.

In addition, D2D relay links 508a and 508b may be established between the UEs to enable relaying of communications between the base station and one or more UEs. For example, a relay link 508a between UE 502a and 502c may enable communication between the base station 504 and UE 502c to be relayed via UE 502a over wireless communication link 506a and relay link 508a. Similarly, the relay link 508a may enable communication to be relayed in the opposite direction (e.g., between the base station 504 and the UE 502a via UE 502c). In addition, another relay link 508b may enable communication between the base station 504 and UE 502b to be relayed via UE 502c over wireless communication link 506c and relay link 508b. Similarly, relay link 508b may enable communication to be relayed in the opposite direction (e.g., between the base station 504 and UE 502c via UE 502b). In some examples, each relay link 508a and 508b is a mmWave relay link. To facilitate mmWave communication and reasonable performance/coverage over a sphere around the UE, each UE may include two or more antenna array modules to perform beamformed transmissions in different directions.

Figure 6:
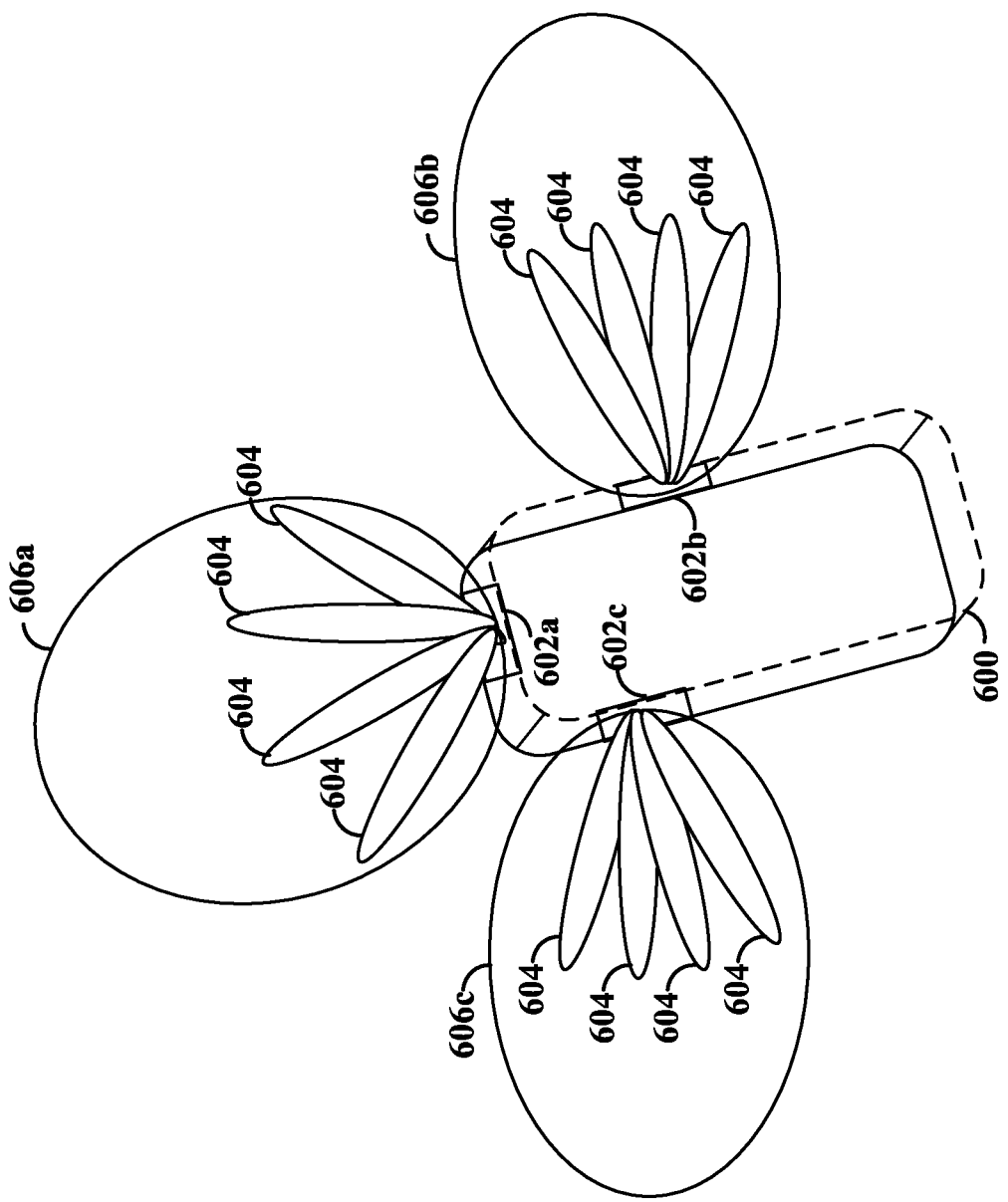
FIG. 6 is a diagram illustrating an example of a mobile device including a plurality of antenna array modules for beamforming according to some aspects.

FIG. 6 is a diagram illustrating an example of a UE 600 including a plurality of antenna array modules 602a-602c. The UE 600 may correspond to any of the UEs illustrated in FIG. 1, 2, and/or 5. In addition, the UE 600 may be a 5G mobile device configured to transmit and receive mmWave frequencies using antenna array modules 602a-602c. Although three antenna array modules 602a, 602b, and 602c are illustrated in FIG. 6, it should be understood that the UE may include any number of antenna array modules 602a-602c.

The antenna array modules 602a-602c may be located on the UE 600 at positions that enable each antenna array module 602a-602c to cover a respective portion of a sphere surrounding the UE. In particular, each antenna array module 602a-602c may be configured to generate a plurality of beams 604, each directed towards a different portion of a spatial coverage area of the respective antenna array module 602a-602c. In general, the UE 600 may communicate with another UE using a pair of beams for transmission and reception (e.g., one beam on each UE). The pair of beams form a beam pair link (BPL) between the two UEs.

The number of beams 604 that may be generated per antenna array module 602a-602c may depend, for example, on the number of antenna subarrays in each antenna array module 602a-602c. In general, to meet link budget requirements, each antenna array module 602a-602c may support N beams for each N antenna element subarray in the module. For example, assuming there are two antenna subarrays per antenna array module 602a-602c, the UE 600 may support 2N beams by each antenna array module and 6N beams total (e.g., 3*2N=6N) for the UE. If N=2, as shown in the example of FIG. 6, the UE 600 may support 12 total beams (e.g., four beams from each antenna array module 602a-602c). However, it should be understood that each antenna array module 602a-602c may support any suitable numbers of beams.

To establish a relay link (or other mmWave link) between the UE 600 and another UE (or other wireless device, such as a gNB), the UE 600 and other device may perform a beam sweeping procedure to discover each other and identify the BPL for the mmWave link. Based on the above example, if N=4 on both UEs, the number of beams that each UE may support is 24. Therefore, the total number of beam pairs to be swept to both discover one another and identify the BPL is $24^2=576$ beam pairs. Sweeping through each of these beam pairs is time and power consuming across both UEs.

Therefore, in some examples, the base station may assist the UEs in establishing the relay link by indicating which UEs should be targeted by a specific UE seeking relay link establishment. The base station may further indicate potential BPLs (e.g., a subset of the possible BPLs) that the UEs should sweep in order to select the BPL. In order for the base station to continue to manage the established BPLs and assist with further beam refinements of the relay link, the base station may maintain a number of metrics associated with each BPL. For example, if there are M UEs in a cell managed by a base station, there are M(M−1)/2 UE BPLs, each with multiple metrics (denoted K) to be managed. Examples of metrics may include, but are not limited to, the cell identifier (ID) of each UE, BPL indices of the selected BPL, a timing offset between the UEs to be used in decoding messages therebetween, and a reference signal received power (RSRP) of the established mmWave link. Therefore, the base station may maintain approximately $K*M^2$ metrics, which may increase exponentially as the number of UEs in the cell increases.

In various aspects of the disclosure, to reduce the UE power and time consumption, while also reducing the amount of information (e.g., number of metrics) maintained by the base station, the UEs may facilitate device discovery using pseudo-omnidiectional beams. For example, instead of transmitting on each directional beam 604 in a beam sweeping pattern to enable other receiving UEs to discover the presence of the transmitting UE, the transmitting UE (e.g., UE 600) may transmit a single non-beamformed (e.g., wide) beam 606a-606c from each antenna array module 602a-602c, thus forming pseudo-omnidirectional beams 606a-606c. The non-beamformed beams 606a-606c may be generated, for example, by transmitting from a single antenna element in each antenna array module 602a-602c. Each receiving UE may further receive on a single non-beamformed beam (e.g., at a single antenna element) in each antenna array module 602a-602c. The transmitting and receiving UEs may then select a pseudo-omnidirectional beam pair (e.g., one pseudo-omnidirectional beam on each of the transmitting UE and the receiving UE) for further communication.

Although the use of wider beams in mmWave communication suffers from reduced gain, the link distance between UEs is small (e.g., in comparison to the link distance between the gNB and the UE), and as such, the UEs within range of one another (e.g., within a close enough distance to receive mmWave beams) are able to discover each other using pseudo-omnidirectional beams. In some examples, the transmitting UE 600 may transmit a synchronization signal, such as a primary synchronization signal (PSS) and/or a secondary synchronization signal (SSS) on each of the pseudo-omnidirectional beams 606a-606c to facilitate device discovery and enable synchronization of receiving UEs to the transmitting UE 600.

Figure 7:
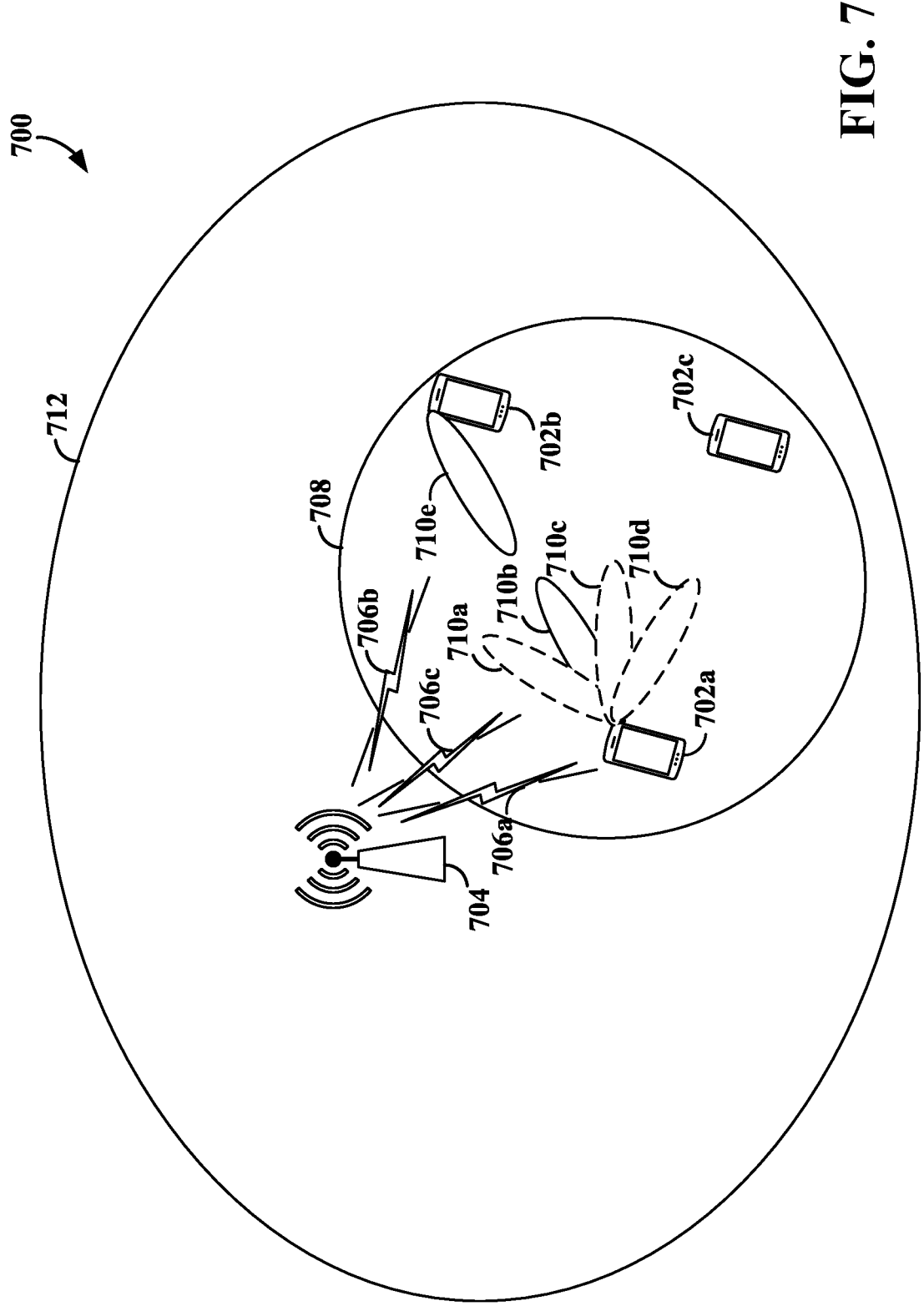
FIG. 7 is a diagram illustrating an exemplary wireless network for facilitating mmWave relay communication according to some aspects.

FIG. 7 is a diagram illustrating an exemplary wireless network 700 for facilitating mmWave relay communication. The wireless network 700 may correspond, for example, to the RAN 200 illustrated in FIG. 2 and/or the wireless network 500 shown in FIG. 5. The wireless network 700 may include a fifth generation base station (e.g., a gNB) 704 in wireless communication one or more UEs 702a, 702b, and 702c within a coverage area of a cell 712 served by the base station 704. In the example shown in FIG. 7, the base station 704 may communicate with each of the UEs 702a, 702b, and 702c via a respective wireless communication link 706a, 706b, and 706c. Each of the wireless communication links 706a, 706b, and 706c may utilize, for example, a mmWave carrier frequency or a sub-6 GHz carrier frequency.

Each of the UEs 702a, 702b, and 702c may further be configured to establish a respective mmWave relay link. This may occur with one or more other UEs using pseudo-omnidirectional beams. In the example shown in FIG. 7, UE 702a is illustrated as transmitting synchronization signals, such as PSS and/or SSS, over pseudo-omnidirectional beams, collectively denoted 708. Each pseudo-omnidirectional beam may be generated as shown and described, for example, in FIG. 6. In some examples, the synchronization signal may include a synchronization signal waveform (e.g., a PSS waveform or an SSS waveform) transmitted within an existing uplink reference signal (RS). For example, the PSS/SSS waveform may be encapsulated within a format of a sounding reference signal (SRS) or other uplink reference signal (e.g., CSI-RS). The PSS and SSS waveforms in 5G-NR follow the Release 15 3GPP specifications in terms of time-frequency resources and RACH resources associated with the waveforms.

The base station 704 may configure resources (e.g., time-frequency resources) that may be utilized for transmitting synchronization signals. For example, the resources may be common resources (e.g., a pool of common resources that UEs may share for discovery synchronization) or UE-specific resources allocated to each UE for relay discovery and synchronization. When the resources are common resources, each UE may transmit non-beamformed synchronization signals in a pre-determined pseudo-random manner. For example, UE 702a may transmit non-beamformed synchronization signals using the common resources at a first time $t_1$, UE 702b may transmit non-beamformed synchronization signals using the common resources at a second time $t_2$, and UE 702c may transmit non-beamformed synchronization signals using the common resources at a third time $t_3$. In some examples, the base station 704 may allocate the resources for synchronization signals based on the known location (e.g., GPS coordinates) of the UEs 702a-702c to coordinate the transmission and reception of synchronization signals among the UEs 702a-702c in the cell 712 and allow for frequency re-use within the cell 712.

UEs may share sync signals (transmit and/or receive) with other UEs. Both UE 702b and UE 702c may receive the synchronization signal(s) from UE 702a, as both UE 702b and UE 702c are within range of UE 702a (e.g., the link budget between UE 702a and each of UE 702b and 702c is high enough to receive the signal). The synchronization signal(s) may include a cell ID associated with the UE 702a that identifies the UE 702a to UEs 702b and 702c and enables the UEs 702b and 702c to establish a link with UE 702a.

UEs may act on sync information in multiple manners. Upon receiving the synchronization signal(s) from UE 702a and decoding the cell ID of UE 702a, a receiving UE, such as UE 702b, may either store the cell ID of UE 702a or convey the cell ID of UE 702a to the base station 704 to indicate that UE 702b is within range of UE 702a (e.g., UE 702b is a candidate for a relay link with UE 702a). Similarly, UE 702c may also either store the cell ID of UE 702a or convey the cell ID of UE 702a to the base station 704 to indicate that UE 702c is within range of UE 702a. The cell ID of UE 702a may be utilized by the UE 702b/702c and/or base station 704 to subsequently establish a relay link between UE 702a and one or both of UE 702b and UE 702c upon the occurrence of an external event. Examples of external events may include, but are not limited to, blockage of a wireless communication link 706a between the base station 703 and UE 702a, fading of the wireless communication link 706a between the base station 704 and UE 702a, or initiation of assisted communication for the wireless communication link 706a using the relay link.

UEs can utilize multiple types of beam management and signaling techniques for communication. In some examples, UE 702b may further measure the received power of each of the synchronization signal(s) transmitted from the UE 702a and received via respective pseudo-omnidirectional beams at the receiving UE 702b to select a pseudo-omnidirectional beam of the receiving UE 702b to initiate a random access procedure with the transmitting UE 702a prior to occurrence of the external event. In an exemplary random access procedure, UE 702b may randomly select a preamble from an available set of preambles within the cell associated with UE 702a, and transmit the selected preamble to the UE 702a in a random access channel (RACH) preamble message. Upon receipt of the RACH preamble message, UE 702a selects a pseudo-omnidirectional beam of the UE 702a (e.g., based on received power measurements of the RACH preamble on each of the pseudo-omnidirectional beams of UE 702a). The UE 702a may then transmit a random access response (RAR) message to UE 702b via the selected pseudo-omnidirectional beam to establish a random access link between UE 702a and UE 702b. The base station 704 may allocate common or UE-specific resources for the transmission of random access messages between UEs. In some examples, the common resources may be the same resources as those utilized for the synchronization signals. The random access procedure intimates the presence of UE 702b to UE 702a and enables a pair of pseudo-omnidirectional beams to be selected by UE 702a and UE 702b for communication over the random access link. In other examples, the UE 702b may not RACH back to UE 702a prior to occurrence of the external event.

Base stations may act to set up, initiate, or facilitate UE sidelinks or relay communication paths. In examples in which UE 702b conveys the cell ID of UE 702a to the base station 704, the base station may trigger a beam training procedure to establish a mmWave relay link between UE 702b and UEs 702a upon the occurrence of the external event. For example, the base station 704 may transmit a message to UE 702b indicating UE 702b should establish a relay link with UE 702a. In examples in which the UE 702b did not RACH back to UE 702a prior to the occurrence of the event, UE 702b may then initiate the random access procedure, as described above, with UE 702a to establish the random access link. UE 702a and UE 702b may then perform beam training over the random access link to select the directional BPL for the relay link and then establish the relay link using the selected directional BPL.

In some examples, the base station 704 may allocate downlink reference signal (RS) resources for beam training. In so doing, the base station 704 can provide beam training information, including the RS resources, a timing offset between the UEs 702a and 702b to be used in decoding messages therebetween, and a subset of potential BPLs between the UEs 702a and 702b to sweep. The subset of BPLs may be determined by the base station, for example, based on the location of each of the UEs, geospatial orientation of the UEs, and path/cluster information related to the environment surrounding the UEs. In some examples, the subset of BPLs may include a list of one or more BPL options in order of priority, where the priority may be determined based on the likelihood (probability) of the BPL being selected (e.g., based on respective locations of the UEs, the geospatial information, and the path information).

Beam training information may include downlink control information. In one example, beam training information may be transmitted to UE 702b from the base station 704, for example, within downlink control information (DCI). In examples in which both UE 702b and 702c convey the cell ID of UE 702a to the base station 704, the base station 704 may trigger a beam training procedure between each of UE 702b and UE 702c and UE 702a to establish multiple relay links with UE 702a that may be utilized by the base station to communicate with UE 702a. In this example, the base station 704 may schedule individual (UE-specific) RS resources for each of the UEs 702b and 702c or may provide common resources that may be shared by UE 702b and UE 702c. The common downlink reference signal (RS) resources may be signaled via common DCI or may be configured via radio resource control (RRC) signaling.

During beam training, UEs 702a and 702b may each transmit respective RSs on each directional beam of the UEs 702a and 702b (or on a subset of directional beams of UEs 702a and 702b indicated by the beam training information). The UEs 702a and 702b may then measure the received power of the RS received on each directional beam of the UEs 702a and 702b (or on a subset of directional beams indicated by UE 702b) and select the directional BPL for the relay link. For example, as shown in FIG. 7, UE 702b may transmit a RS on a directional beam 710e indicated by the beam training information. The UE 702a may receive the RS over one or more directional beams 710a-710d and may select one of the directional beams (e.g., directional beam 710b) for communication with UE 702b via a BPL consisting of beams 710b and 710e.

Once a directional BPL is selected, UEs 702a and 702b may establish a relay link. In some examples, UE 702b may again RACH back to UE 702a via the selected directional BPL to establish the relay link. In some examples, the base station 704 may configure periodic resources (e.g., via RRC signaling) for UEs to perform random access procedures to establish relay links. In other examples, UE 702b may transmit a scheduling request to the base station 704 requesting RACH resources for establishing the relay link. Upon establishment of the relay link, information may then be relayed between the base station 704 and the UE 702a via the relay link between UEs 702a and 702b (e.g., over the BPL 710b and 710e) and the wireless communication link 706b between the base station 704 and UE 702b. In some examples, the base station 704 may configure resources that may be utilized for mmWave relay communication over the relay link. In examples in which the wireless communication links 706a-706c are mmWave communication links, resources may be configured within uplink mmWave resources and may be based on the location(s) of the UEs 702a and 702b. For example, resources may be common resources (e.g., a pool of common resources that UEs may share for relay communication) or UE-specific resources.

BSs can message or signal relay link requests in a variety of manners. In examples in which UEs 702b and 702c locally store the cell ID of UE 702a, the base station 704 may broadcast a message requesting a relay link be established with the UE 702a upon the occurrence of the external event. In this example, a receiving UE, such as UE 702b, may receive the broadcast message, determine that the UE 702b is within range of UE 702a (e.g., based on the stored cell ID), and establish a relay link with the transmitting UE. In this example, the UE 702b may not establish the random access link until receipt of the broadcast message. For example, upon receipt of the broadcast message, UE 702b may initiate a random access procedure with the UE 702a to establish a random access link over a pair of pseudo-omnidirectional beams. UE 702b may then perform beam training with UE 702a over the random access link to select a directional beam pair link (BPL) for the relay link and then establish the relay link using the directional BPL, as discussed above. Information may then be relayed between the base station 704 and the UE 702a via the relay link between UEs 702a and 702b (e.g., over the BPL 710b and 710e) and the wireless communication link 706b between the base station 704 and UE 702b. In this example, the base station 704 may not provide beam training information to the UEs 702a and 702b. Therefore, the UEs 702a and 702b may determine a subset of potential directional beams (BPLs) to select from based on, for example, the selected pseudo-omnidirectional beams or other information (e.g., UE locations, geospatial information, etc.). For example, the UEs 702a and 702b may include the directional BPLs in the subset of potential directional BPLs that correspond to the antenna array modules associated with the selected pseudo-omnidirectional beams.

Figure 8:
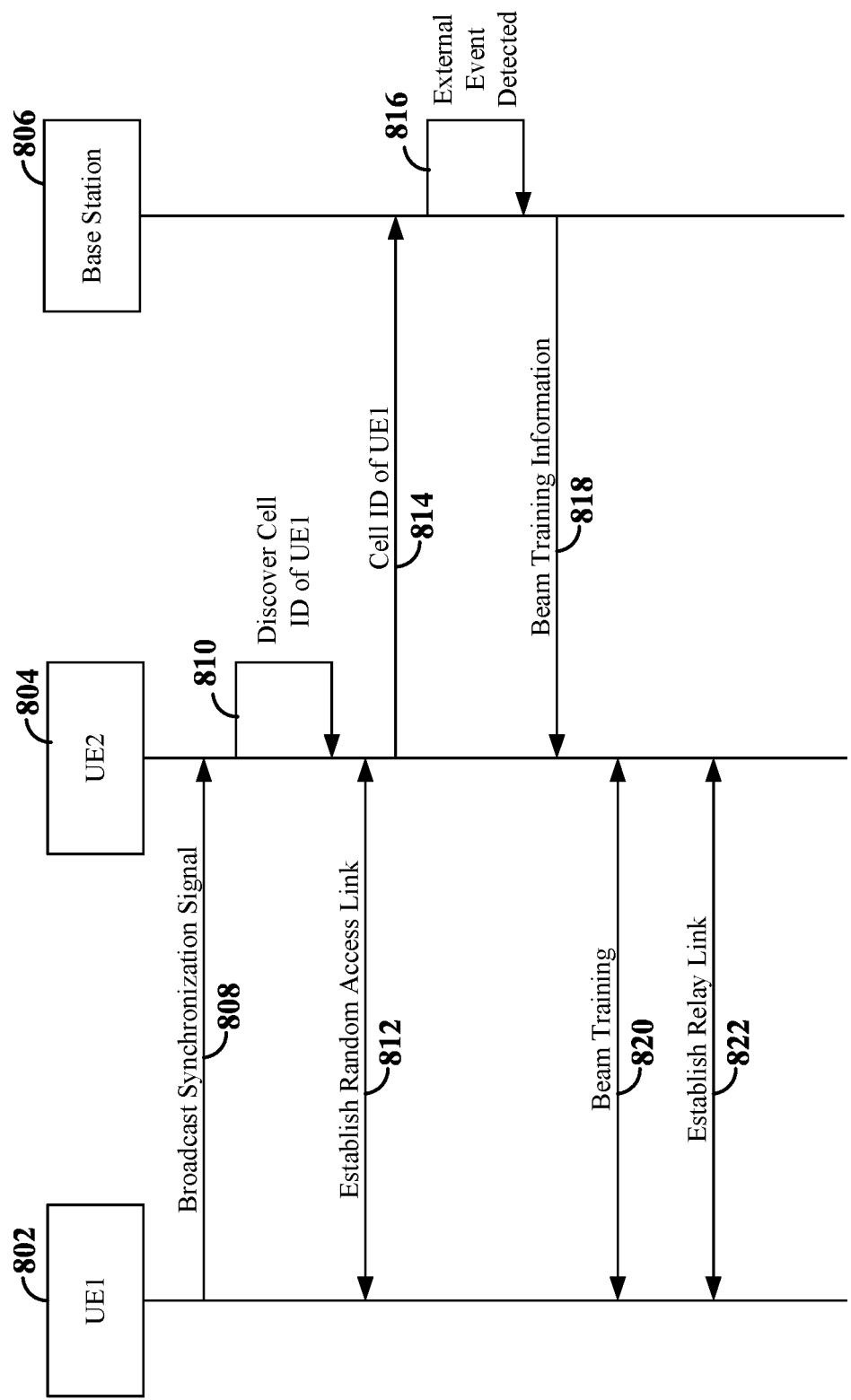
FIG. 8 is a signaling diagram illustrating exemplary signaling to establish a mmWave relay link between UEs according to some aspects.

FIG. 8 is a signaling diagram illustrating exemplary signaling to establish a mmWave relay link between UEs 802 and 804 with the assistance of a base station 806. At 808, UE1 802 broadcasts synchronization signals, such as PSS and/or SSS, over pseudo-omnidirectional beams. The synchronization signals may be broadcast over resources (e.g., time-frequency resources) allocated by the base station 806 for PSS/SSS transmissions. For example, the resources may be common resources (e.g., a pool of common resources that UEs may share for discovery synchronization) or UE-specific resources allocated to UE1 802. UE2 804 may receive the synchronization signal(s) from UE1 802, and at 810, discover a cell ID associated with UE1 802 from the synchronization signal(s) that identifies UE1 802 and enables UE2 804 to establish a link with UE1 802.

At 812, UE2 804 may measure received power of synchronization signals. Such sync signals may be transmitted from UE1 802 and received via respective pseudo-omnidirectional beams at UE2 804. These can be used to select a pseudo-omnidirectional beam of UE2 804 to initiate a random-access procedure with UE1 802 and establish a random-access link between UE2 804 and UE1 802. The random-access procedure intimates the presence of UE2 804 to UE1 802 and enables a pair of pseudo-omnidirectional beams to be selected by UE1 802 and UE2 804 for communication over the random-access link.

At 814, UE2 804 may further convey the cell ID of UE1 802 to the base station 806. This can be used to indicate that UE2 804 is within range of UE1 802 (e.g., UE2 804 is a candidate for a relay link with UE1 802). At 816, the base station 806 may detect that an external event has occurred. Examples of external events may include, but are not limited to, blockage of a wireless communication link between the base station 806 and UE1 802, fading of the wireless communication link between the base station 806 and UE1 802, or initiation of assisted communication for the wireless communication link using a relay link.

At 818, the base station 806 may then trigger a beam training procedure. This triggering can include indications to establish a mmWave relay link between UE2 804 and UE1 802. In some examples, this can include indications to transmit a message to UE2 804 indicating UE2 804 should establish a relay link with UE1 802. The message may further include beam training information, such as downlink RS resources, a timing offset between the UEs 802 and 804 to be used in decoding messages therebetween, and at least one BPL option (e.g., a subset of potential BPLs) between the UEs 802 and 804 to sweep. In some examples, the message may include one or more of a higher layer (e.g., RRC) signaling message, DCI included within a PDCCH and/or other type of message.

At 818, the UEs 802 and 804 may perform beam training to select a directional BPL for a relay link to be established therebetween. For example, UEs 802 and 804 may each transmit respective RSs on each directional beam of the UEs 802 and 804 (or on a subset of directional beams of UEs 802 and 804 indicated by the beam training information) in a beam-sweeping manner. The UEs 802 and 804 may then measure the received power of the RS received on each directional beam and select the directional BPL for the relay link. In some examples, UE1 802 may select the BPL and transmit a beam measurement report indicating the selected BPL to UE2 804. Once the directional BPL is selected, at 820, UEs 802 and 804 may establish the relay link. Upon establishment of the relay link, information may then be relayed between the base station 806 and the UE 802 via the relay link between UEs 802 and 804.

Figure 9:
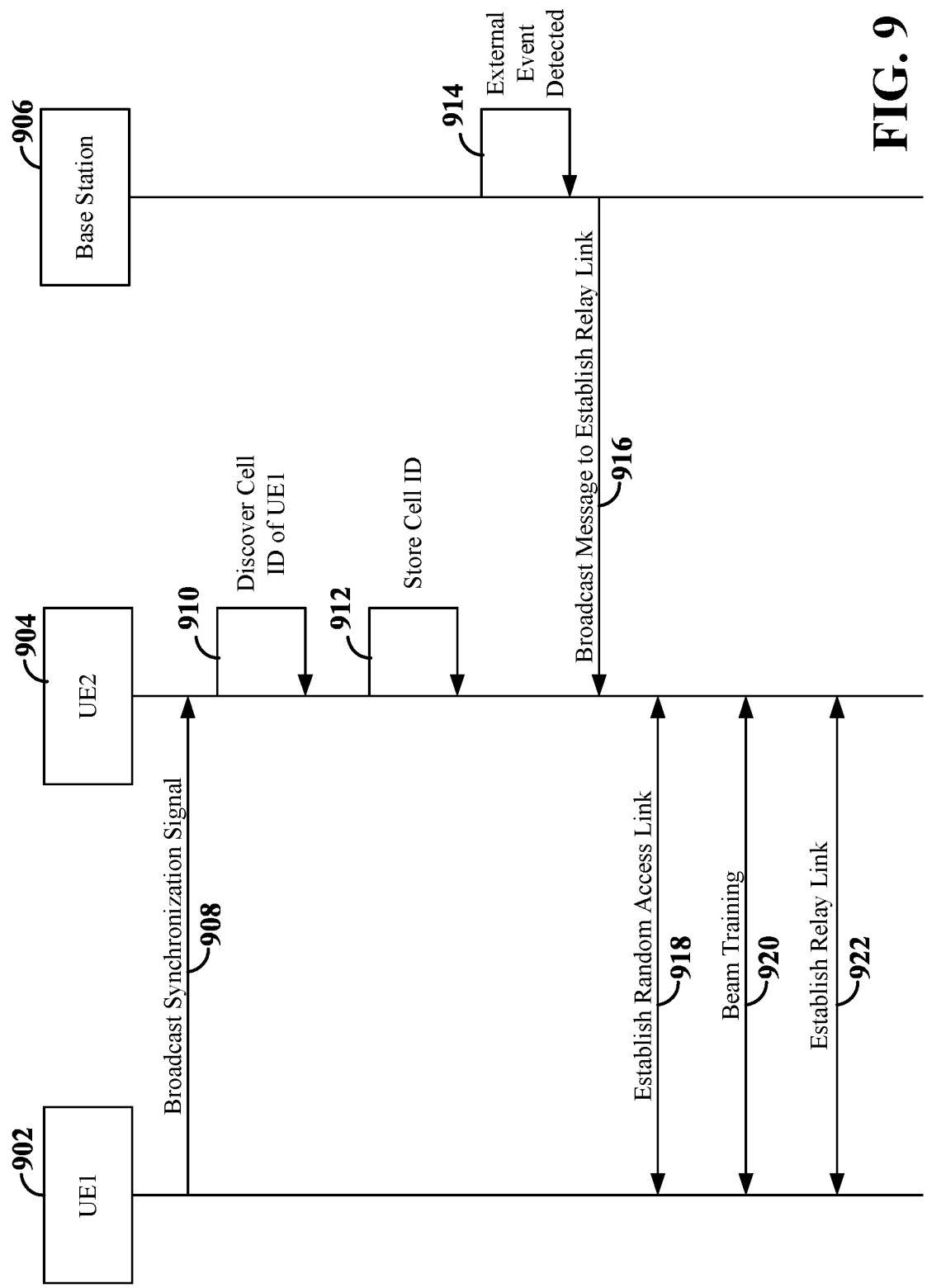
FIG. 9 is a signaling diagram illustrating other exemplary signaling to establish a mmWave relay link between UEs according to some aspects.

FIG. 9 is a signaling diagram illustrating other exemplary signaling to establish a mmWave relay link between UEs 902 and 904 with the assistance of a base station 906. At 908, UE1 902 broadcasts synchronization signals, such as PSS and/or SSS, over pseudo-omnidirectional beams. The synchronization signals may be broadcast over resources (e.g., time-frequency resources) allocated by the base station 906 for PSS/SSS transmissions. For example, the resources may be common resources (e.g., a pool of common resources that UEs may share for discovery synchronization) or UE-specific resources allocated to UE1 902. UE2 904 may receive the synchronization signal(s) from UE1 902, and at 910, discover a cell ID associated with UE1 902 from the synchronization signal(s) that identifies UE1 902 and enables UE2 904 to establish a link with UE1 902.

At 912, UE2 904 may store the cell ID of UE1 902 for subsequent use, as described below. At 914, the base station 906 may detect that an external event has occurred. Examples of external events may include, but are not limited to, blockage of a wireless communication link between the base station 906 and UE1 902, fading of the wireless communication link between the base station 906 and UE1 902, or initiation of assisted communication for the wireless communication link using a relay link.

At 916, the base station 906 may then broadcast a message requesting a relay link be established with the UE1 902 upon the occurrence of the external event. UE2 904 may receive the broadcast message, determine that UE2 904 is within range of UE1 902 (e.g., based on the stored cell ID), and at 918, initiate a random access procedure with UE1 902 to establish a random access link over a pair of pseudo-omnidirectional beams. At 920, the UEs 902 and 904 may perform beam training over the random access link to select a directional BPL for the relay link. During beam training, the UEs 902 and 904 may determine a subset of potential directional beams (BPLs) to select from based on, for example, the selected pseudo-omnidirectional beams or other information (e.g., UE locations, geospatial information, etc.). At 922, the UEs 902 and 904 may establish a relay link using the directional BPL. Information may then be relayed between the base station 906 and UE1 902 via the relay link between UEs 902 and 904.

Figure 10:
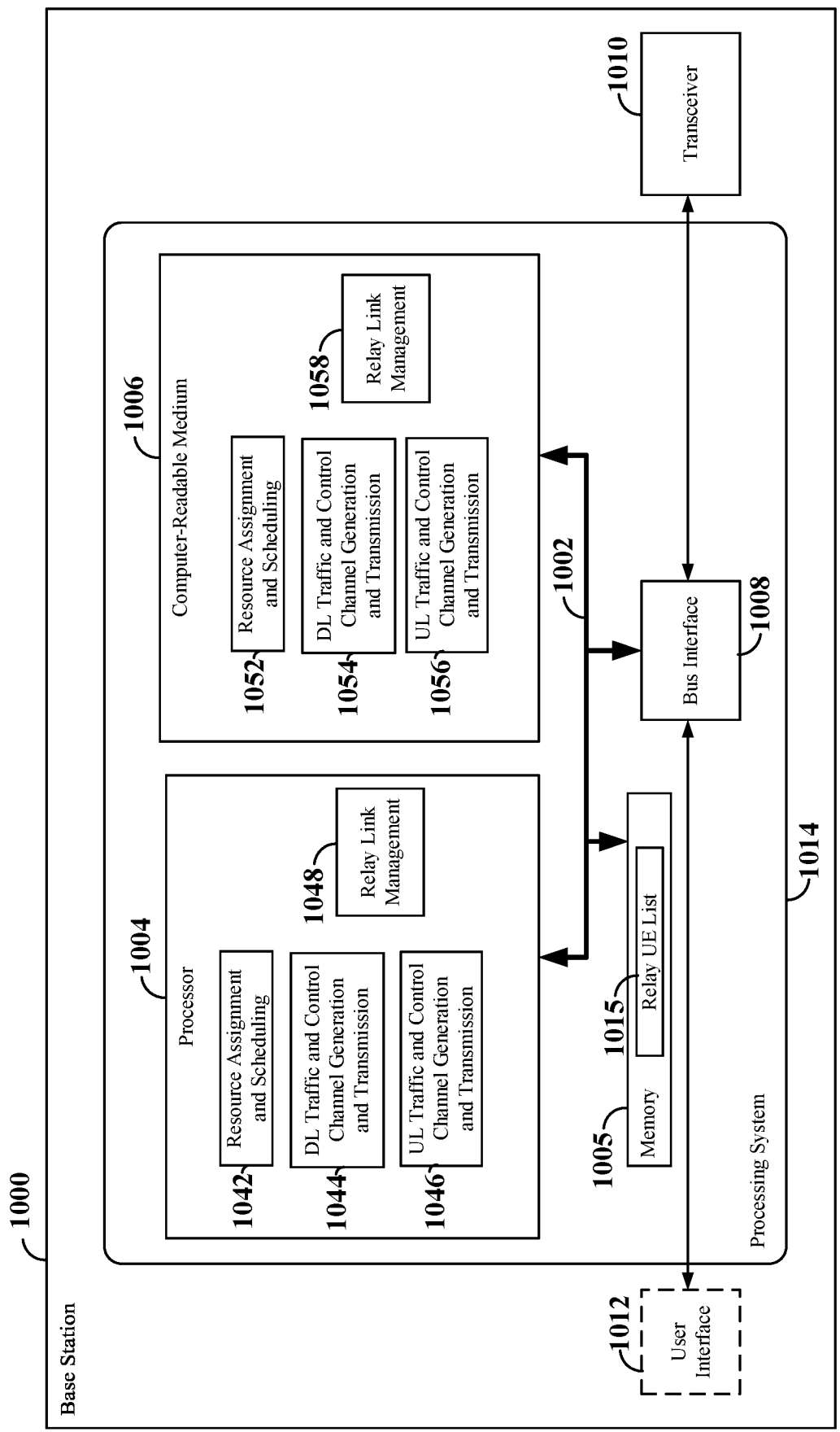
FIG. 10 is a block diagram illustrating an example of a hardware implementation for a base station employing a processing system according to some aspects.

FIG. 10 is a conceptual diagram illustrating an example of a hardware implementation for an exemplary base station 1000 employing a processing system 1014. For example, the base station 1000 may be a base station as illustrated in any one or more of FIGS. 1 and 2. In another example, the base station 1000 may be a user equipment (UE) as illustrated in any one or more of FIGS. 1, 2, 5, and/or 7-9.

The base station 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1000 may be configured to perform any one or more of the functions described herein. That is, the processor 1004, as utilized in a base station 1000, may be used to implement any one or more of the processes described below. The processor 1004 may in some instances be implemented via a baseband or modem chip and in other implementations, the processor 1004 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium (e.g., air interface). Depending upon the nature of the apparatus, a user interface 1012 (e.g., keypad, display, speaker, microphone, joystick) may also be provided. Of course, such a user interface 1012 is optional, and may be omitted in some examples.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. In some examples, the computer-readable medium 1006 may be part of the memory 1005. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include resource assignment and scheduling circuitry 1042, configured to generate, schedule, and modify a resource assignment or grant of time-frequency resources (e.g., a set of one or more resource elements). For example, the resource assignment and scheduling circuitry 1042 may schedule time-frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 1042 may be configured to allocate/schedule resources for the transmission of synchronization signals, random access signals, beam reference signals (RSs), and relay communication between UEs. For example, the resource assignment and scheduling circuitry 1042 may be configured to allocate uplink resources (e.g., within a PUCCH or PUSCH) for the transmission of synchronization signals, random access signals, RSs, and relay communication between UEs. In some examples, the resources may be UE-specific resources or the resources may be common resources that may be shared by the UEs. In addition, the resources may be dynamically scheduled, semi-statically scheduled, or semi-persistently scheduled to provide for periodic resources that may be utilized by the UEs in a pseudo-random manner. In some examples, the resources may be scheduled based on the location(s) of the UEs served by the base station 1000 to facilitate re-use of mmWave resources between distant UEs.

The resource assignment and scheduling circuitry 1042 may further be configured to schedule resources for the transmission of a downlink message to one or more UEs indicating that a relay link should be established with another UE. In some examples, the resource assignment and scheduling circuitry 1042 may further schedule resources for the transmission of beam training information from the base station 1000 to a potential relay UE. The resource assignment and scheduling circuitry 1042 may further be configured to execute resource assignment and scheduling software 1052 stored in the computer-readable medium 1006 to implement one or more of the functions described herein.

The processor 1004 may further include downlink (DL) traffic and control channel generation and transmission circuitry 1044, configured to generate and transmit downlink user data traffic and control channels within one or more subframes, slots, and/or mini-slots. The DL traffic and control channel generation and transmission circuitry 1044 may operate in coordination with the resource assignment and scheduling circuitry 1042 to place the DL user data traffic and/or control information onto a time division duplex (TDD) or frequency division duplex (FDD) carrier by including the DL user data traffic and/or control information within one or more subframes, slots, and/or mini-slots in accordance with the resources assigned to the DL user data traffic and/or control information by the resource assignment and scheduling circuitry 1042.

For example, the DL traffic and control channel generation and transmission circuitry 1044 may be configured to transmit scheduling information indicating the resources scheduled by the resource assignment and scheduling circuitry 1042 for uplink transmissions related to relay links to one or more UEs. Examples of uplink transmissions may include synchronization signals, random access signals, beam reference signals (RSs), and relay communication between UEs. The DL traffic and control channel generation and transmission circuitry 1044 may further be configured to transmit a message to one or more UEs indicating that a relay link should be set up with another UE. In addition, the DL traffic and control channel generation and transmission circuitry 1044 may be configured to transmit beam training information to one or more UEs to assist the UEs with establishing respective relay links with other UEs. The DL traffic and control channel generation and transmission circuitry 1044 may further be configured to execute DL traffic and control channel generation and transmission software 1054 stored in the computer-readable medium 1006 to implement one or more of the functions described herein.

The processor 1004 may further include uplink (UL) traffic and control channel reception and processing circuitry 1046, configured to receive and process uplink control channels and uplink traffic channels from one or more scheduled entities. For example, the UL traffic and control channel reception and processing circuitry 1046 may be configured to receive uplink control information (UCI) or uplink user data traffic from one or more scheduled entities. In addition, the UL traffic and control channel reception and processing circuitry 1046 may operate in coordination with the resource assignment and scheduling circuitry 1042 to schedule UL user data traffic transmissions, DL user data traffic transmissions and/or DL user data traffic retransmissions in accordance with the received UCI.

In some examples, the UL traffic and control channel reception and processing circuitry 1046 may be configured to receive cell IDs of one or more UEs from one or more other UEs indicating that the one or more other UEs are within range of the one or more UEs. The UL traffic and control channel reception and processing circuitry 1046 may further store the received cell IDs and associated UE identities (e.g., UE ID of the UE that transmitted the cell ID and the UE ID of the UE associated with the cell ID) within a relay UE list 1015, which may be stored, for example, in memory 1005. The relay UE list 1015 indicates which UEs are in range of other UEs in the cell, and as such, are candidates for establishing relay links. The UL traffic and control channel reception and processing circuitry 1046 may further be configured to receive scheduling requests from UEs requesting resources for the transmission of one or more of synchronization signals, random access messages, beam reference signals (RSs), and relay communication between UEs. The UL traffic and control channel reception and processing circuitry 1046 may further be configured to execute UL traffic and control channel reception and processing software 1056 stored in the computer-readable medium 1006 to implement one or more of the functions described herein.

The processor 1004 may further include relay link management circuitry 1048 configured to detect the occurrence of an external event related to a particular UE. Examples of external events may include, but are not limited to, blockage of a wireless communication link between the base station 1000 and the particular UE, fading of the wireless communication link between the base station 1000 and the particular UE, or initiation of assisted communication for the wireless communication link between the base station 1000 and the particular UE using a relay link. Upon detecting the occurrence of the external event, the relay management circuitry 1048 may trigger the generation of a message indicating that a relay link should be established with the particular UE. In some examples, the message may be a unicast message directed towards a potential relay UE. In this example, the relay management circuitry 1048 may access the relay UE list 1015 to identify the potential relay UE. The relay link management circuitry 1048 may further generate two or more unicast messages, each to a potential relay UE indicated by the relay UE list 1015. The relay link management circuitry 1048 may further be configured to generate and transmit beam training information to the potential relay UE(s) to assist the potential relay UE(s) in establishing respective relay links with the particular UE. The beam training information for a potential relay UE may include, for example, RS resources, a timing offset between the potential relay UE and particular UE to be used in decoding messages therebetween, and at least one BPL option between the UEs to sweep. The relay link management circuitry 1048 may be configured to operate together with the resource assignment and scheduling circuitry 1042 and DL traffic and control channel generation and transmission circuitry 1044 to transmit the unicast message(s) and beam training information to the one or more identified potential relay UEs.

In other examples, the message may be a broadcast message including a request for a relay link to be established with the particular UE. In this example, the relay link management circuitry 1048 may not have the cell ID of any UEs within range of the particular UE stored in the relay UE list 1015 or the base station may not maintain the relay UE list 1015. In this example, the resource assignment and scheduling circuitry 1042 may allocate resources for a potential relay UE to RACH back to the particular UE, perform beam training, and establish the relay link. The resources may be allocated in response to a scheduling request from the potential relay UE or the resources may be common resources periodically configured for the potential relay UE to utilize. Once the relay link is established, the relay link management circuitry 1048 may further be configured to manage the relay link. For example, the relay link management circuitry 1048 may be configured to operate in coordination with the resource assignment and scheduling circuitry 1042 to schedule resources for communication over the relay link. The relay link management circuitry 1048 may further be configured to execute relay link management software 1058 stored in the computer-readable medium 1006 to implement one or more of the functions described herein.

Figure 11:
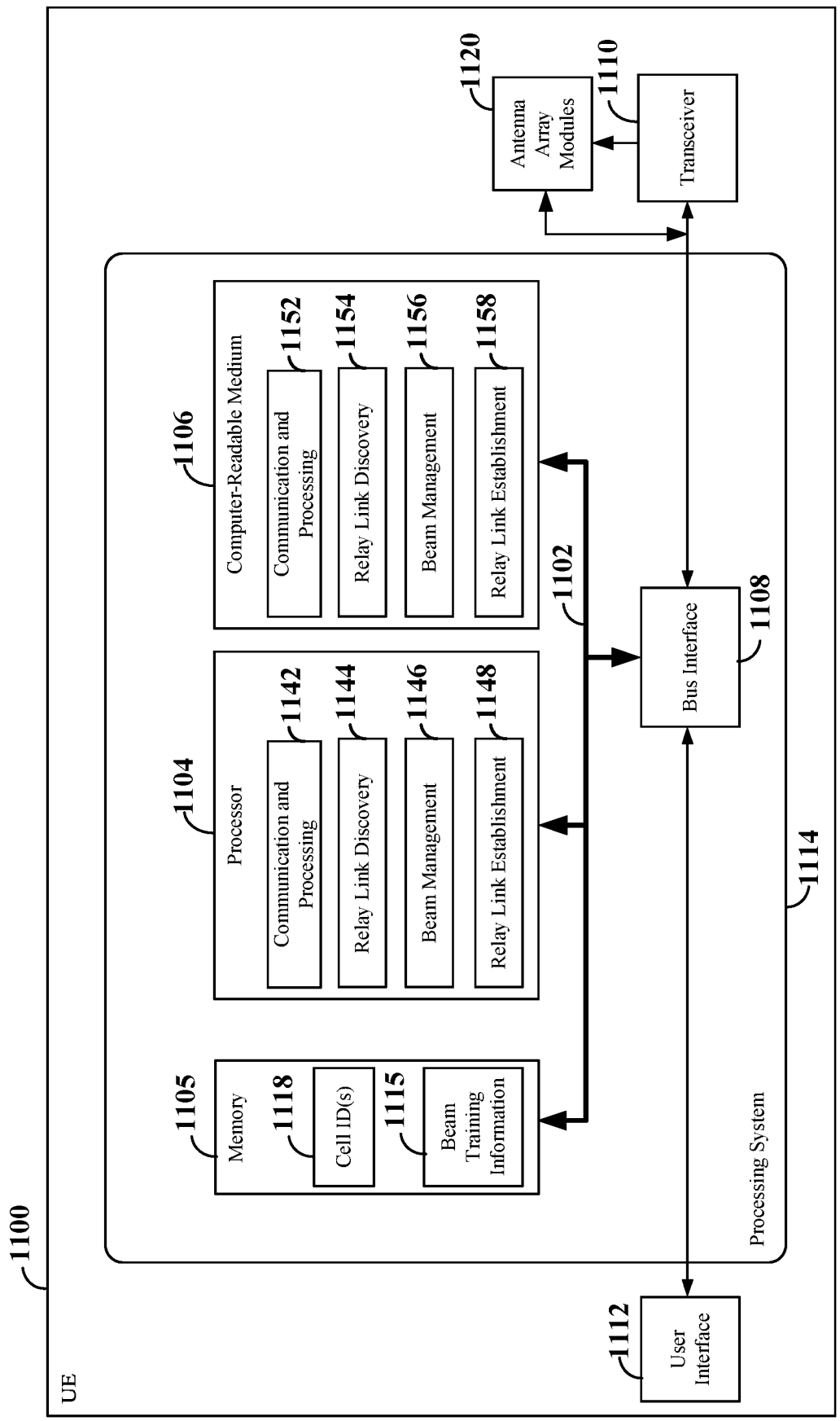
FIG. 11 is a block diagram illustrating an example of a hardware implementation for a UE employing a processing system according to some aspects.

FIG. 11 is a conceptual diagram illustrating an example of a hardware implementation for an exemplary user equipment (e.g., UE 1100) employing a processing system 1114. For example, the UE 1100 may be a UE as illustrated in any one or more of FIGS. 1, 2 and/or 5-9.

The processing system 1114 may be substantially the same as the processing system 1014 illustrated in FIG. 10, including a bus interface 1108, a bus 1102, memory 1105, a processor 1104, and a computer-readable medium 1106. Furthermore, the UE 1100 may include a user interface 1112 and a transceiver 1110 substantially similar to those described above in FIG. 10. In addition, the UE may further include one or more antenna array modules 1120. In accordance with various aspects of the disclosure, an element, or any portion of an element, or any combination of elements may be implemented with the processing system 1114 that includes one or more processors 1104. That is, the processor 1104, as utilized in a UE 1100, may be used to implement any one or more of the processes described below.

In some aspects of the disclosure, the processor 1104 may include circuitry configured for various functions. For example, the processor 1104 may include communication and processing circuitry 1142 configured to communicate with a base station. In some examples, the communication and processing circuitry 1141 may include one or more hardware components that provide the physical structure that performs processes related to wireless communication (e.g., signal reception and/or signal transmission) and signal processing (e.g., processing a received signal and/or processing a signal for transmission). In some examples, the communication and processing circuitry 1142 may be configured to generate and transmit an uplink signal at a mmWave frequency or a sub-6 GHz frequency via the transceiver 1110 and antenna array module(s) 1120. In addition, the communication and processing circuitry 1142 may be configured to receive and process a downlink signal at a mmWave frequency or a sub-6 GHz frequency via the antenna array module(s) 1120 and the transceiver 1110.

The communication and processing circuitry 1142 may further be configured to transmit and receive mmWave relay signals to and from other UEs. In some examples, the mmWave relay signals may include synchronization signals, random access messages, beam reference signals (RSs), and/or relay communications. The communication and processing circuitry 1142 may further be configured to execute communication and processing software 1152 stored on the computer-readable medium 1106 to implement one or more functions described herein.

The processor 1104 may further include relay link discovery circuitry 1144, beam management circuitry 1146, and relay link establishment circuitry 1148. The relay link discovery circuitry 1144 may be configured to operate in coordination with the communication and processing circuitry 1142 and the beam management circuitry 1146 to generate and transmit one or more synchronization signals (e.g., PSS/SSS) over pseudo-omnidirectional beams. For example, the beam management circuitry 1146 may select a single antenna element in each of the antenna array modules 1120 to form pseudo-omnidirectional beams for carrying the synchronization signals. The communication and processing circuitry 1142 may utilize resources allocated for the synchronization signals by the base station. In some examples, the resources may include uplink resources allocated for the transmission of uplink reference signals. In addition, the communication and processing circuitry 1142 may encapsulate a PSS/SSS waveform within the format of an uplink reference signal (e.g., a SRS) to transmit the synchronization signal.

The relay link discovery circuitry 1144 may further be configured to operate in coordination with the communication and processing circuitry 1142 and the beam management circuitry 1146 to receive one or more synchronization signals (e.g., PSS/SSS) from other UEs over pseudo-omnidirectional beams. In some examples, the communication and processing circuitry 1142 may utilize resource information provided by the base station to determine when to transmit synchronization signals and when other UEs may be transmitting synchronization signals. For example, the communication and processing circuitry 1142 may utilize common resources pseudo-randomly. In other examples, the communication and processing circuitry may utilize UE-specific resources. In some examples, the UE-specific resources may be granted to different UEs at different times (e.g., based on the known locations of the UEs) to transmit and receive synchronization signals.

The relay link discovery circuitry 1144 may further decode a cell ID of the transmitting UE included within the synchronization signals to detect a presence of the UE 1100 within range of the transmitting UE. In some examples, the relay link discovery circuitry 1144 may further operate in coordination with the communication and processing circuitry 1142 to convey the cell ID of the transmitting UE to the base station to indicate that the UE 1100 is within range of the transmitting UE. In other examples, the relay link discovery circuitry 1144 may store the cell ID of the transmitting UE in a list of cell ID(s) 1118 within, for example, memory 1105. The relay link discovery circuitry 1144 may further be configured to execute relay link discovery software 1154 stored on the computer-readable medium 1106 to implement one or more functions described herein.

The relay link establishment circuitry 1148 may be configured to establish respective relay links with one or more other UEs. In some examples, the relay link establishment circuitry 1148 may be triggered by the communication and processing circuitry 1142 upon receiving a message from a base station requesting a relay link be established with another UE. For example, the message may be a unicast message or a broadcast message. In examples in which the message is a unicast message, the relay link establishment circuitry 1148 may further receive from the communication and processing circuitry 1142 beam training information provided by the base station for use in selecting a BPL for the relay link with the other UE. In examples in which the message is a broadcast message, the relay link establishment circuitry 1148 may access the list of cell ID(s) 1118 to compare the cell ID of the other UE included in the broadcast message to the list of cell ID(s) 1118 maintained by the UE 1100 to determine if the other UE is within range of the UE 1100.

In some examples, the relay link establishment circuitry 1148 may operate in coordination with the communication and processing circuitry 1142 and beam management circuitry 1146 to perform a random access procedure with the other UE via selected pseudo-omnidirectional beams (e.g., a pair of pseudo-omnidirectional beams selected by the beam management circuitry 1146 based on the synchronization signals and/or random access preamble). In some examples, the relay link establishment circuitry 1148 may initiate the random access procedure with the other UE upon receiving the unicast or broadcast message requesting the relay link with the other UE. In other examples, the relay link establishment circuitry 1148 may initiate the random access procedure with the other UE upon the relay link discovery circuitry 1144 receiving the synchronization signal(s) from the other UE.

After establishing a random access link with the other UE, the relay link establishment circuitry 1148 may operate together with the communication and processing circuitry 1142 and beam management circuitry 1146 to perform beam training with the other UE over resources allocated by the base station for beam training. For example, the beam management circuitry 1146 may be configured to initiate a beam sweep across one or more antenna array modules 1120 to enable the other UE to select a beam (or BPL) for the relay link based on the beam sweep. In some examples, the beam management circuitry 1146 may utilize the beam training information to identify a subset of potential BPLs (e.g., a list of BPL options) to sweep. In this example, the beam management circuitry 1146 may select the directional BPL for the relay link from the list of BPL options based on an order of the beam pair link options in the list. In other examples, the beam management circuitry 1146 may determine the subset of potential directional beams (BPLs) to sweep based on, for example, the selected pseudo-omnidirectional beams for the random access link and/or other information (e.g., UE locations, geospatial information, etc.). The beam management circuitry 1146 may further receive RSs across one or more directional beams from the other UE and may measure the beam reference signal received power (RSRP) or received signal strength indicator (RSSI) of each of the received directional beams. The beam management circuitry 1146 may then select a directional beam (or BPL) for communication with the other UE for the relay link. The beam management circuitry 1146 may further be configured to execute beam management software 1156 stored on the computer-readable medium 1106 to implement one or more of the functions described herein.

The relay link establishment circuitry 1148 may further be configured to utilize the selected directional BPL to establish the relay link with the other UE. For example, the relay link establishment circuitry 1148 may again RACH back to the other UE via the selected directional BPL to establish the relay link using, for example, common resources, periodic resources or UE-specific resources allocated by the base station for the random access procedure. Upon establishment of the relay link, information may then be relayed between the base station and the other UE via the relay link. The relay link establishment circuitry 1148 may further be configured to execute relay link establishment software 1158 stored on the computer-readable medium 1106 to implement one or more of the functions described herein.

Figure 12:
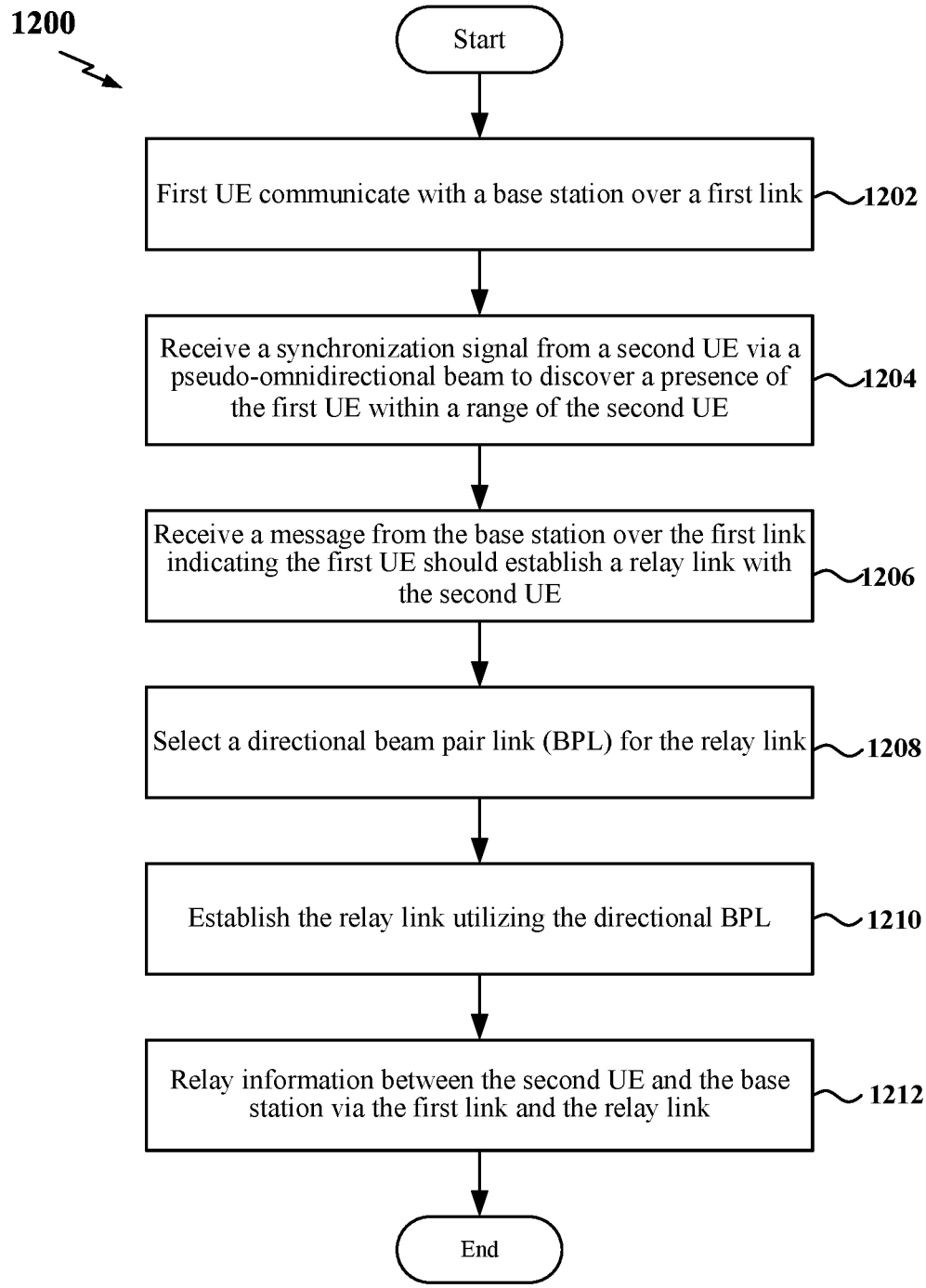
FIG. 12 is a flow chart of an exemplary method for a UE to establish a mmWave relay link according to some aspects.

FIG. 12 is a flow chart 1200 of a method for a UE to establish a mmWave relay link. As described below, some or all illustrated features may be omitted in a particular implementation within the scope of the present disclosure, and some illustrated features may not be required for implementation of all embodiments. In some examples, the method may be performed by the UE 1100, as described above and illustrated in FIG. 11, by a processor or processing system, or by any suitable means for carrying out the described functions.

At block 1202, the UE (e.g., a first UE) may receive a first signal from a second UE via a pseudo-omnidirectional beam to discover that the first UE is within a range of the second UE. The first signal may include one or more synchronization signals (e.g., PSS and/or SSS) that may be transmitted within uplink resources. In some examples, the synchronization signal(s) may be encapsulated within an uplink reference signal (e.g., an SRS) and received over common or UE-specific resources allocated for the synchronization signal(s). The pseudo-omnidirectional beam may correspond, for example, to a beam formed by a single antenna element within an antenna array module. The first signal may further include the cell ID of the second UE. For example, the communication and processing circuitry 1142, relay link discovery circuitry 1144, and beam management circuitry 1146, together with the transceiver 1110, shown and described above in connection with FIG. 11 may receive the synchronization signal(s) including the cell ID of the second UE to discover the presence of the first UE within range of the second UE.

At block 1204, the first UE may receive a second signal from the base station over a first link between the base station and the first UE. The second signal may indicate that the first UE establish a relay link with the second UE. In some examples, the second signal is a unicast message directed to the first UE. In other examples, the second signal is a broadcast message sent out to all UEs in the cell. For example, the communication and processing circuitry 1142 and relay link establishment circuitry 1148, together with the transceiver 11110, shown and described above in connection with FIG. 11 may receive the second signal from the base station to trigger relay link establishment with the second UE.

At block 1206, the first UE may establish a relay link with the second UE utilizing a directional BPL for mmWave communication over the relay link. In some examples, the first UE may RACH back to the second UE via the pseudo-omnidirectional beams to establish a random access link therebetween. The random access procedure may be performed upon receipt of the message from the base station or after receiving the synchronization signal(s) from the second UE. In some examples, the first UE may then utilize beam training information provided by the base station to identify at least one BPL option to sweep to select the directional BPL for the relay link. In other examples, the first UE may determine the at least one BPL option to sweep based on, for example, the selected pseudo-omnidirectional beams for the random access link or other information (e.g., UE locations, geospatial information, etc.). In some examples, the first UE and the second UE may utilize a set of common reference signal resources (e.g., RS resources) or a set of UE-specific reference signal resources (e.g., either of which may be uplink resources) to perform beam training and select the directional BPL for the relay link. For example, the communication and processing circuitry 1142, beam management circuitry 1146 and relay link establishment circuitry 1148 may establish the relay link utilizing the directional BPL.

At block 1208, the first UE may relay information between the second UE and the base station via the first link and the relay link. In some examples, the first UE may utilize uplink resources allocated by the base station for relay communication. For example, the communication and processing circuitry 1142, together with the transceiver 1110, may relay information between the second UE and the base station over the relay link.

Figure 13:
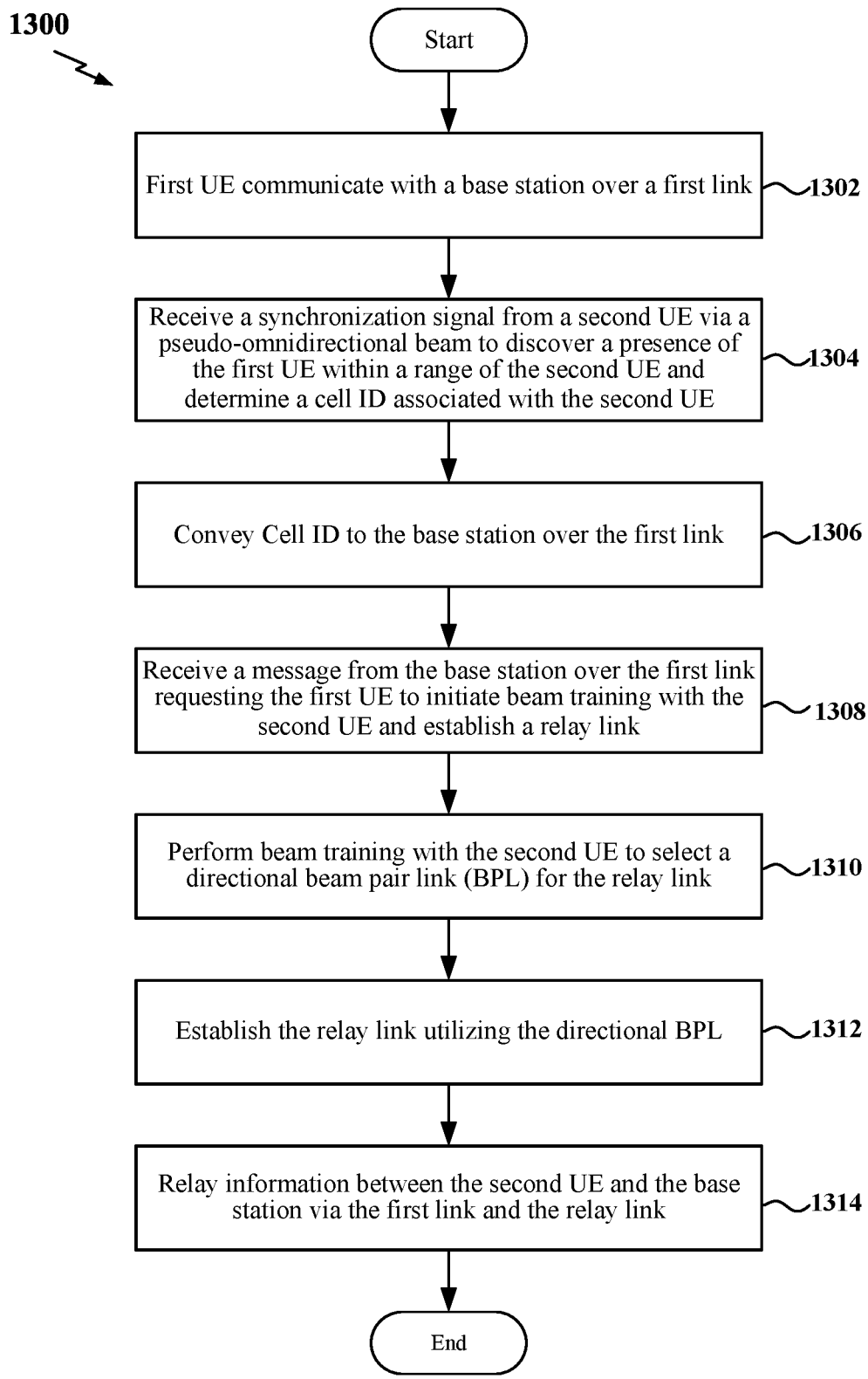
FIG. 13 is a flow chart of another exemplary method for a UE to establish a mmWave relay link according to some aspects.

FIG. 13 is a flow chart 1300 of another method for a UE to establish a mmWave relay link. As described below, some or all illustrated features may be omitted in a particular implementation within the scope of the present disclosure, and some illustrated features may not be required for implementation of all embodiments. In some examples, the method may be performed by the UE 1100, as described above and illustrated in FIG. 11, by a processor or processing system, or by any suitable means for carrying out the described functions.

At block 1302, the UE (e.g., a first UE) may communicate with a base station over a first link. For example, the first link may be a mmWave link or a sub-6 GHz link. For example, the communication and processing circuitry 1142, together with the transceiver 1110, shown and described above in connection with FIG. 11 may communicate with the base station.

At block 1304, the first UE may receive a synchronization signal from a second UE. In one example, the second UE may transmit a pseudo-omnidirectional beam to discover presence of the first UE (e.g., within a range of the second UE). The synchronization signal may be, for example, a PSS and/or SSS that may be transmitted within uplink resources. In some examples, the synchronization signal(s) may be encapsulated within an uplink reference signal (e.g., an SRS) and received over common or UE-specific resources allocated for the synchronization signal(s). The pseudo-omnidirectional beam may correspond, for example, to a beam formed by a single antenna element within an antenna array module. The synchronization signal(s) may further include the cell ID of the second UE. For example, the communication and processing circuitry 1142, relay link discovery circuitry 1144, and beam management circuitry 1146, together with the transceiver 1110, shown and described above in connection with FIG. 11 may receive the synchronization signal(s) including the cell ID of the second UE to discover the presence of the first UE within range of the second UE.

At block 1306, the first UE may convey the cell ID of the second UE to the base station over the first link. For example, the communication and processing circuitry 1142 and relay link discovery circuitry 1144, together with the transceiver 1110, shown and described above in connection with FIG. 11 above may convey the cell ID to the base station.

At block 1308, the first UE may receive a unicast message from the base station. The unicast message may arrive over the first link and request that the first UE establish a relay link with the second UE. For example, the communication and processing circuitry 1142 and relay link establishment circuitry 1148, together with the transceiver 1110, shown and described above in connection with FIG. 11 may receive the message from the base station to trigger relay link establishment with the second UE.

At block 1310, the first UE may perform beam training with the second UE. This beam training may occur over the random access link to select a directional BPL for the relay link with the second UE. The directional BPL may be utilized for mmWave communication over the relay link. In some examples, the first UE may RACH back to the second UE via the pseudo-omnidirectional beams to establish a random access link therebetween. The random access procedure may be performed upon receipt of the message from the base station or after receiving the synchronization signal(s) from the second UE. In some examples, the first UE may then utilize beam training information provided by the base station to identify at least one BPL option to sweep to select the directional BPL for the relay link. In some examples, the first UE and the second UE may utilize a set of common reference signal resources (e.g., RS resources) or a set of UE-specific reference signal resources to perform beam training and select the directional BPL for the relay link. For example, the communication and processing circuitry 1142, beam management circuitry 1146 and relay link establishment circuitry 1148 may select the directional BPL for the relay link.

At block 1312, the first UE may establish a relay link with the second UE. Relay link establishment may occur utilizing the directional BPL. In some examples, the first UE may again RACH back to the second UE via the directional BPL to establish the relay link. For example, the communication and processing circuitry 1142 and relay link establishment circuitry 1148 shown and described above in connection with FIG. 11 may establish the relay link.

At block 1314, the first UE may relay information between the second UE and the base station. This relay communication path may occur via the first link and the relay link. In some examples, the first UE may utilize uplink resources allocated by the base station for relay communication. For example, the communication and processing circuitry 1142, together with the transceiver 1110, may relay information between the second UE and the base station over the relay link.

Figure 14:
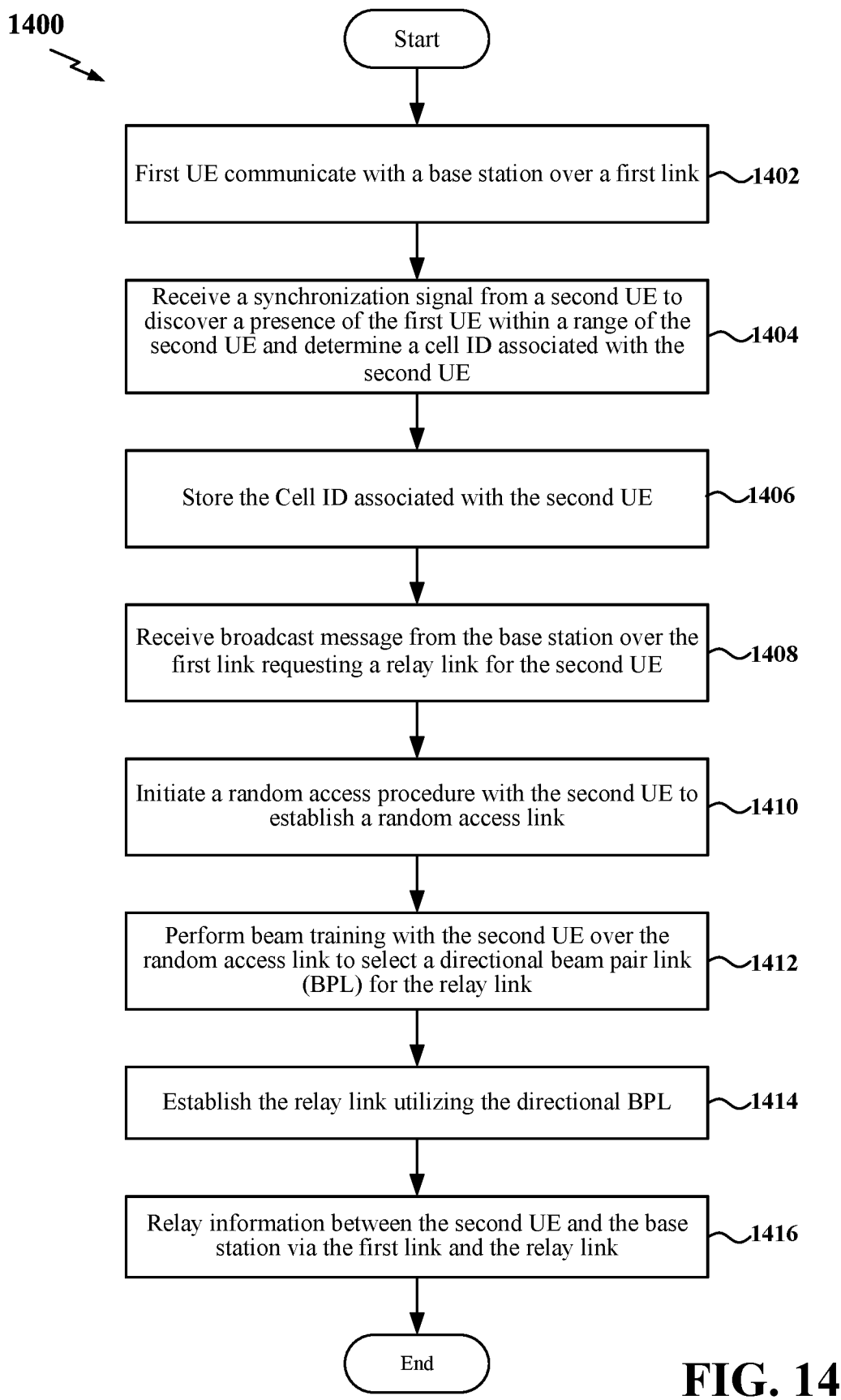
FIG. 14 is a flow chart of another exemplary method for a UE to establish a mmWave relay link according to some aspects.

FIG. 14 is a flow chart 1400 of a method for a UE to establish a mmWave relay link. As described below, some or all illustrated features may be omitted in a particular implementation within the scope of the present disclosure, and some illustrated features may not be required for implementation of all embodiments. In some examples, the method may be performed by the UE 1100, as described above and illustrated in FIG. 11, by a processor or processing system, or by any suitable means for carrying out the described functions.

At block 1402, the UE (e.g., a first UE) may communicate with a base station over a first link. For example, the first link may be a mmWave link or a sub-6 GHz link. For example, the communication and processing circuitry 1142, together with the transceiver 1110, shown and described above in connection with FIG. 11 may communicate with the base station.

At block 1404, the first UE may receive a synchronization signal from a second UE. The sync signal may be transmitted by the second UE via a pseudo-omnidirectional beam. The sync signal can enable the second UE to discover a presence of the first UE (e.g., within a range of the second UE). The synchronization signal may be, for example, a PSS and/or SSS that may be transmitted within uplink resources. In some examples, the synchronization signal(s) may be encapsulated within an uplink reference signal (e.g., an SRS) and received over common or UE-specific resources allocated for the synchronization signal(s). The pseudo-omnidirectional beam may correspond, for example, to a beam formed by a single antenna element within an antenna array module. The synchronization signal(s) may further include the cell ID of the second UE. For example, the communication and processing circuitry 1142, relay link discovery circuitry 1144, and beam management circuitry 1146, together with the transceiver 1110, shown and described above in connection with FIG. 11 may receive the synchronization signal(s) including the cell ID of the second UE to discover the presence of the first UE within range of the second UE.

At block 1406, the first UE may store the cell ID of the second UE. For example, the first UE may store the cell ID of the second UE within a list of cell IDs of nearby UEs (e.g., UEs within range of the first UE). For example, the relay link discovery circuitry 1144 and memory 1105 shown and described above in connection with FIG. 11 may store the cell ID of the second UE.

At block 1408, the first UE may receive a message from the base station over the first link. This received message can indicate that the first UE should establish a relay link with the second UE. In some examples, the message is a broadcast message sent out to all UEs in the cell. For example, the communication and processing circuitry 1142 and relay link establishment circuitry 1148, together with the transceiver 1110, shown and described above in connection with FIG. 11 may receive the message from the base station to trigger relay link establishment with the second UE.

At block 1410, the first UE may initiate a random access procedure (e.g., by transmitting a random access preamble message) with the second UE via the pseudo-omnidirectional beams to establish a random access link therebetween. The random access procedure may be performed upon receipt of the message from the base station. For example, the communication and processing circuitry 1142 and relay link establishment circuitry 1148 may initiate the random access procedure with the second UE.

At block 1412, the first UE may perform beam training with the second UE over the random access link to select a directional BPL for the relay link with the second UE. The directional BPL may be utilized for mmWave communication over the relay link. In some examples, the first UE may determine at least one BPL option to sweep based on, for example, the selected pseudo-omnidirectional beams for the random access link or other information (e.g., UE locations, geospatial information, etc.). In some examples, the first UE and the second UE may utilize a set of common reference signal resources (e.g., RS resources) or a set of UE-specific reference signal resources (e.g., either of which may be uplink resources) to perform beam training and select the directional BPL for the relay link. For example, the communication and processing circuitry 1142, beam management circuitry 1146 and relay link establishment circuitry 1148 may select the directional BPL for the relay link.

At block 1414, the first UE may establish a relay link with the second UE utilizing the directional BPL. In some examples, the first UE may again RACH back to the second UE via the directional BPL to establish the relay link. For example, the communication and processing circuitry 1142 and relay link establishment circuitry 1148 shown and described above in connection with FIG. 11 may establish the relay link.

At block 1416, the first UE may relay information between the second UE and the base station via the first link and the relay link. In some examples, the first UE may utilize uplink resources allocated by the base station for relay communication. For example, the communication and processing circuitry 1142, together with the transceiver 1110, may relay information between the second UE and the base station over the relay link.

Figure 15:
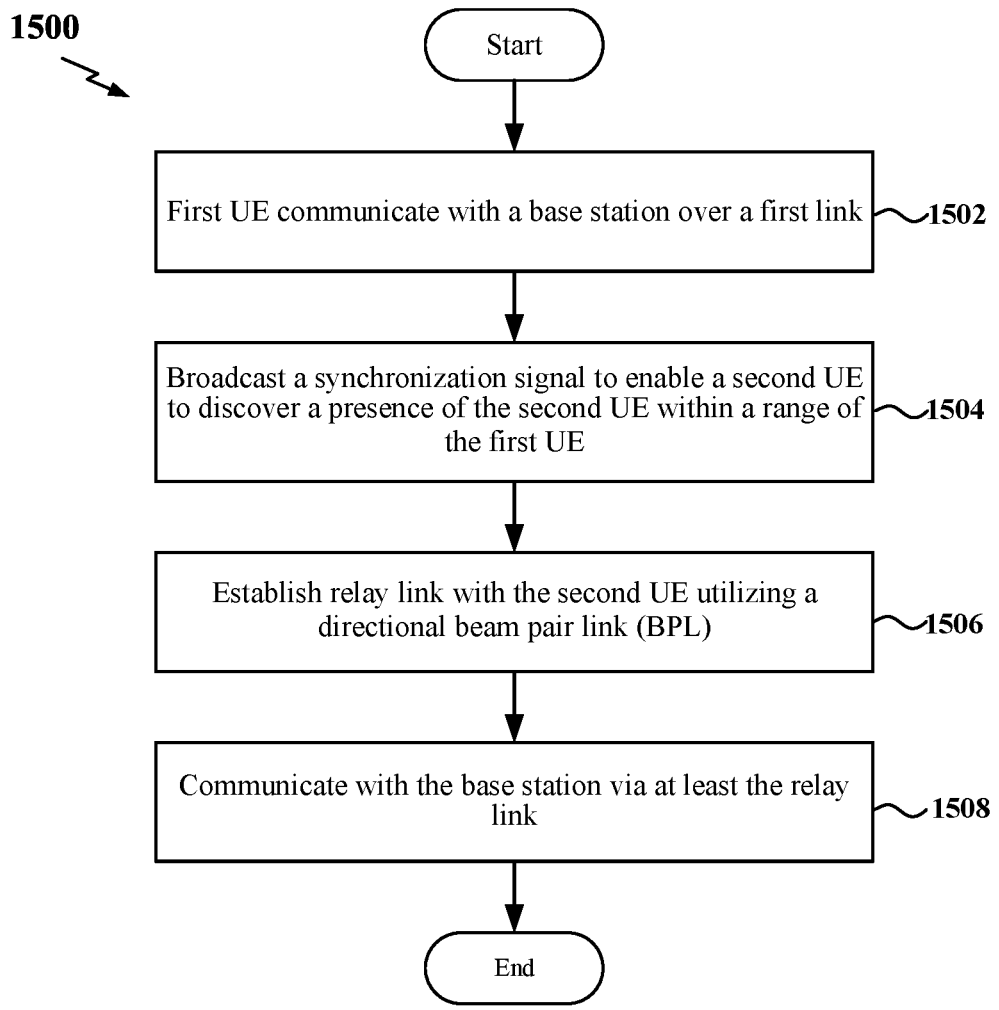
FIG. 15 is a flow chart of another exemplary method for a UE to establish a mmWave relay link according to some aspects.

FIG. 15 is a flow chart 1500 of a method for a UE to establish a mmWave relay link. As described below, some or all illustrated features may be omitted in a particular implementation within the scope of the present disclosure, and some illustrated features may not be required for implementation of all embodiments. In some examples, the method may be performed by the UE 1100, as described above and illustrated in FIG. 11, by a processor or processing system, or by any suitable means for carrying out the described functions.

At block 1502, the UE (e.g., a first UE) may broadcast a signal that may be received by a second UE. This broadcast may be accomplished via a pseudo-omnidirectional beam; and this broadcast may enable the second UE to discover its presence within a range of the first UE. The synchronization signal may be, for example, a PSS and/or SSS that may be transmitted within uplink resources. In some examples, the synchronization signal(s) may be encapsulated within an uplink reference signal (e.g., an SRS) and received over common or UE-specific resources allocated for the synchronization signal(s). The pseudo-omnidirectional beam may correspond, for example, to a beam formed by a single antenna element within an antenna array module. The synchronization signal(s) may further include the cell ID of the first UE. For example, the communication and processing circuitry 1142, relay link discovery circuitry 1144, and beam management circuitry 1146, together with the transceiver 1110, shown and described above in connection with FIG. 11 may broadcast the synchronization signal(s) including the cell ID of the first UE to enable the second UE to discover the first UE.

At block 1504, the first UE may establish a relay link with the second UE utilizing a directional BPL. In some examples, the first UE may receive a random access message from the second UE via the pseudo-omnidirectional beams to initiate a random access procedure to establish a random access link therebetween. The second UE may then perform beam training with the first UE via the random access link to select the directional BPL. In some examples, the first UE and the second UE may utilize a set of common reference signal resources (e.g., RS resources) or a set of UE-specific reference signal resources (e.g., either of which may be uplink resources) to perform beam training and select the directional BPL for the relay link. The first and second UEs may then establish the relay link utilizing the directional BPL. For example, the communication and processing circuitry 1142, beam management circuitry 1146 and relay link establishment circuitry 1148 shown and described above in connection with FIG. 11 may establish the relay link.

At block 1506, the first UE may communicate with the base station via at least the relay link with the second UE. In some examples, the first UE may utilize uplink resources allocated by the base station for relay communication. For example, the communication and processing circuitry 1142, together with the transceiver 1110, shown and described above in connection with FIG. 11 may communicate with the base station over the relay link.

Figure 16:
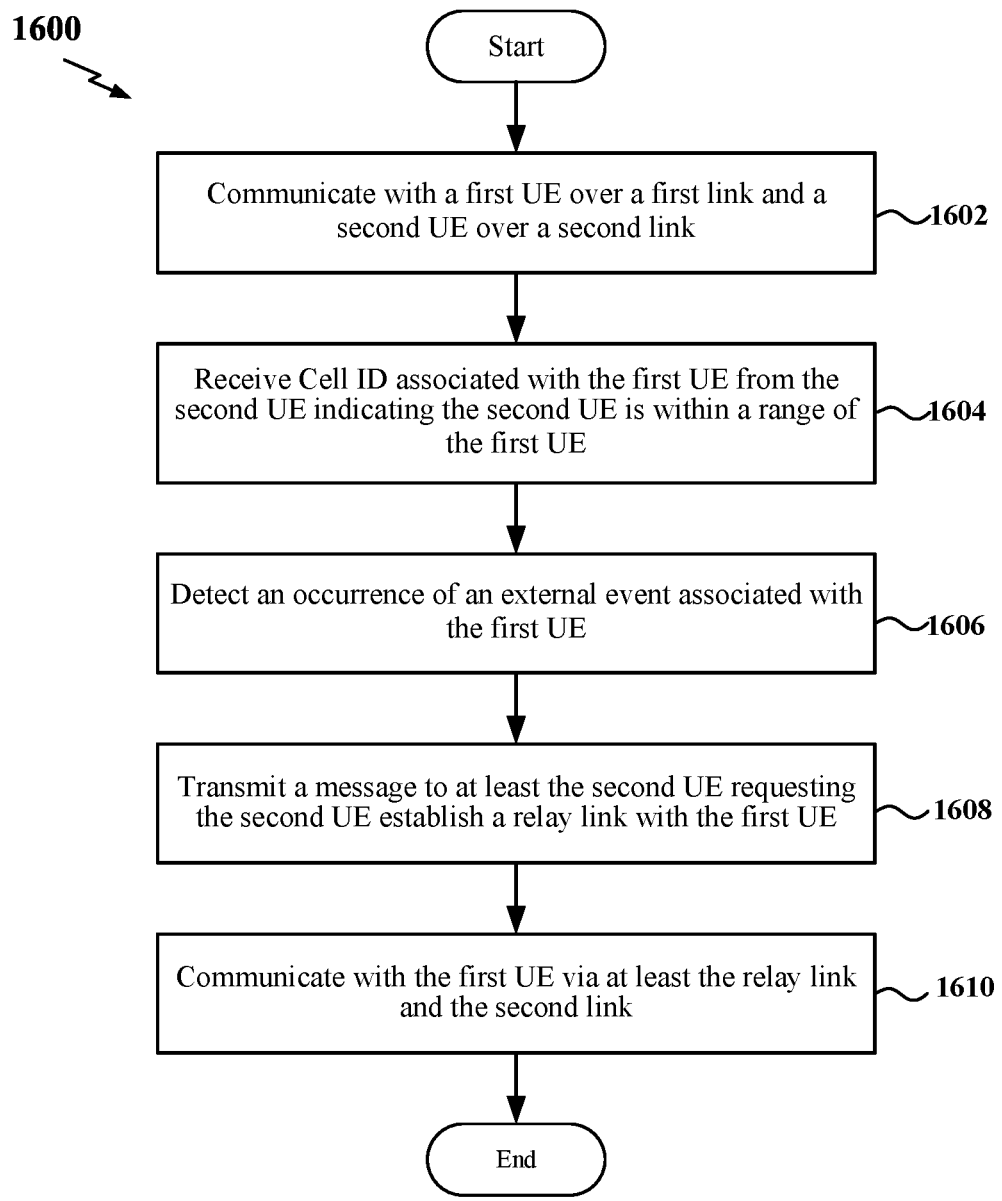
FIG. 16 is a flow chart of an exemplary method for a base station to establish a mmWave relay link according to some aspects.

FIG. 16 is a flow chart 1600 of a method for a base station to establish a mmWave relay link. As described below, some or all illustrated features may be omitted in a particular implementation within the scope of the present disclosure, and some illustrated features may not be required for implementation of all embodiments. In some examples, the method may be performed by the base station 1000, as described above and illustrated in FIG. 10, by a processor or processing system, or by any suitable means for carrying out the described functions.

At block 1602, the base station may communicate with a first UE over a first link and a second UE over a second link. The first link and second link may be mmWave links or sub-6 GHz links. For example, the DL traffic and control channel generation and transmission circuitry 1044 and UL traffic and control channel reception and processing circuitry 1046, together with the transceiver 1010, shown and described above in connection with FIG. 10 may communicate with the first and second UEs.

At block 1604, the base station may receive a cell ID. This cell ID may be associated with the first UE. The cell ID may originate from the second UE via the second link, indicating that the second UE is within a range of the first UE. For example, the UL traffic and control channel reception and processing circuitry 1046, together with the transceiver 1010, shown and described above in connection with FIG. 10 may receive the cell ID of the first UE from the second UE.

At block 1606, the base station may detect the occurrence of an external event associated with the first UE, such as blockage of the first link, fading of the first link, or initiation of assisted communication for the first link using a relay link. For example, the relay link management circuitry 1048 shown and described above in connection with FIG. 10 may detect the occurrence of the external event.

At block 1608, the base station may transmit a message (e.g., a unicast message) to the second UE. This message may request the second UE to establish a relay link with the first UE (e.g., based on an occurrence of an external event). In some examples, the base station may further transmit beam training information to the second UE to assist with a beam training procedure between the first UE and the second UE to select a directional BPL for the relay link. In some examples, the base station may receive the cell ID of the first UE from multiple other UEs, indicating that each of the other UEs is within range of the first UE. In this example, the base station may transmit a respective message to two or more of the other UEs requesting each of the other UEs to establish a respective relay link with the first UE upon the occurrence of the external event. For example, the DL traffic and control channel generation and transmission circuitry 1044, together with the transceiver 1010, may transmit the message to the second UE.

At block 1610, the base station may communicate with multiple UEs in various manners. The base station can, for example, communicate with the first UE via at least the combination of the relay link between the first UE and the second UE and the second link between the base station and the second UE. In another example, the DL traffic and control channel generation and transmission circuitry 1044 and UL traffic and control channel reception and processing circuitry 1046, together with the transceiver 1010, shown and described above in connection with FIG. 10 may communicate with the first UE via the second link with the second UE and the relay link between the second UE and the first UE.

FIG. 17 is a flow chart 1700 of a method for a base station to establish a mmWave relay link. As described below, some or all illustrated features may be omitted in a particular implementation within the scope of the present disclosure, and some illustrated features may not be required for implementation of all embodiments. In some examples, the method may be performed by the base station 1000, as described above and illustrated in FIG. 10, by a processor or processing system, or by any suitable means for carrying out the described functions.

At block 1702, the base station may communicate with a first UE over a first link. The first link may be a mmWave link or a sub-6 GHz link. For example, the DL traffic and control channel generation and transmission circuitry 1044 and UL traffic and control channel reception and processing circuitry 1046, together with the transceiver 1010, shown and described above in connection with FIG. 10 may communicate with the first UE.

At block 1704, the base station may detect the occurrence of an external event associated with the first UE. This external event can include blockage of the first link, fading of the first link, or initiation of assisted communication for the first link using a relay link. For example, the relay link management circuitry 1048 shown and described above in connection with FIG. 10 may detect the occurrence of the external event.

At block 1706, the base station may broadcast a message requesting another UE establish a relay link. The request message can, for example, seek that another UE communicate with the first UE (e.g., based on the occurrence of an external event). For example, the DL traffic and control channel generation and transmission circuitry 1044, together with the transceiver 1010, may broadcast the message requesting the relay link with the first UE.

At block 1708, the base station may communicate with multiple UEs in various scenarios. For example, the base station can communicate with the first UE via at least the combination of a relay link between the first UE and a second UE and a second link between the base station and the second UE. For example, the DL traffic and control channel generation and transmission circuitry 1044 and UL traffic and control channel reception and processing circuitry 1046, together with the transceiver 1010, shown and described above in connection with FIG. 10 may communicate with the first UE via the second link with the second UE and the relay link between the second UE and the first UE.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, and 4-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a first user equipment (UE) in a wireless communication network, the method comprising:
   receiving a message from a base station over a first link upon an occurrence of an external event;
   performing beam training with a second UE in response to the message to select a directional beam pair link with the second UE; and
   communicating with the second UE using the directional beam pair link via a relay link.

2. The method of claim 1, further comprising:
   receiving a signal from the second UE via at least one pseudo omni-directional beam to discover that the first UE is within a range of the second UE; and
   determining a cell identifier (ID) associated with the second UE based on the signal.

3. The method of claim 2, further comprising:
   conveying the cell ID of the second UE to the base station to report a presence of the first UE within the range of the second UE; and
   storing the cell ID of the second UE.

4. The method of claim 2, wherein the signal comprises at least one synchronization signal.

5. The method of claim 1, further comprising:
   receiving beam training information, wherein the beam training information comprises reference signal resources, a timing offset, and at least one beam pair link option to utilize for beam training.

6. The method of claim 5, wherein the at least one beam pair link option further comprises a list of beam pair link options, and further comprising:
   selecting the directional beam pair link for the relay link from the list of beam pair link options based on an order of the beam pair link options in the list.

7. The method of claim 5, wherein the reference signal resources for the beam training comprise a set of common resources.

8. The method of claim 5, wherein the reference signal resources for the beam training comprise a set of UE-specific resources.

9. The method of claim 1, further comprising:
   initiating a random access procedure with the second UE to establish a random access link with the second UE; and
   performing beam training with the second UE over the random access link to select the directional beam pair link.

10. The method of claim 1, further comprising:
    communicating with the second UE over the relay link utilizing a millimeter wave carrier frequency.

11. The method of claim 1, wherein the external event comprises blockage of a second link between the base station and the second UE, fading of the second link between the base station and the second UE, or initiation of assisted communication for the second link using the relay link.

12. The method of claim 1, wherein the external event comprises a beam failure event associated with a second link between the base station and the second UE, and the message is a broadcast message to a plurality of UEs comprising the first UE, the broadcast message requesting assistance from the plurality of UEs in establishing respective relay links with the second UE.

13. The method of claim 1, further comprising:
    establishing the relay link with the second UE using the directional beam pair link; and
    relaying information between the second UE and the base station via the first link and the relay link.

14. A first user equipment (UE), comprising:
    a wireless transceiver;
    one or more memories; and
    one or more processors coupled to the wireless transceiver and the one or more memories, wherein the one or more processors are configured to:
       receive a message from a base station over a first link upon an occurrence of an external event;
       perform beam training with a second UE in response to the message to select a directional beam pair link with the second UE; and communicate with the second UE using the directional beam pair link via a relay link.

15. The first UE of claim 14, wherein the one or more processors are further configured to:
receive a signal from the second UE via at least one pseudo omni-directional beam to discover that the first UE is within a range of the second UE; and
determine a cell identifier (ID) associated with the second UE based on the signal.

16. The first UE of claim 15, wherein the one or more processors is further configured to:
convey the cell ID of the second UE to the base station to report the presence of the first UE within the range of the second UE; and
store the cell ID of the second UE within the memory.

17. The first UE of claim 14, wherein the one or more processors are further configured to:
receive beam training information, wherein the beam training information comprises reference signal resources, a timing offset, and at least one beam pair link option to utilize for beam training.

18. The first UE of claim 17, wherein the at least one beam pair link option further comprises a list of beam pair link options, and wherein the processor is further configured to:
select the directional beam pair link for the relay link from the list of beam pair link options based on an order of the beam pair link options in the list.

19. The first UE of claim 14, wherein the message comprises a broadcast message, and the one or more processors are further configured to:
initiate a random access procedure with the second UE in response to receiving the broadcast message to establish a random access link with the second UE;
perform beam training with the second UE over the random access link to select the directional beam pair link; and
establish the relay link utilizing the directional beam pair link.

20. A method of wireless communication at a first user equipment (UE) in a wireless communication network, the method comprising:
broadcasting a signal via at least one pseudo-omnidirectional beam to enable a second UE to discover that the second UE is within a range of the first UE;
performing beam training with the second UE to select a directional beam pair link for communication with the second UE via a relay link upon an occurrence of an external event; and
communicating with the second UE via the relay link.

* * * * *